US008843239B2

(12) United States Patent
Mighdoll et al.

(10) Patent No.: US 8,843,239 B2
(45) Date of Patent: Sep. 23, 2014

(54) METHODS, SYSTEMS, AND RELATED ARCHITECTURES FOR MANAGING NETWORK CONNECTED THERMOSTATS

(75) Inventors: Lee Mighdoll, Palo Alto, CA (US); Anthony Michael Fadell, Portola Valley, CA (US); Oliver W. Steele, Amherst, MA (US)

(73) Assignee: Nest Labs, Inc., Palo Alto, CA (US)

( * ) Notice: Subject to any disclaimer, the term of this patent is extended or adjusted under 35 U.S.C. 154(b) by 335 days.

(21) Appl. No.: 13/275,311

(22) Filed: Oct. 17, 2011

(65) Prior Publication Data

US 2012/0239221 A1    Sep. 20, 2012

(51) Int. Cl.
G05D 23/00    (2006.01)

(52) U.S. Cl.
USPC ......... 700/277; 700/300; 236/91 D; 236/91 E

(58) Field of Classification Search
USPC ............ 700/9, 276, 277, 300; 236/1 C, 91 D, 236/91 E
See application file for complete search history.

(56) References Cited

U.S. PATENT DOCUMENTS

| 4,276,925 A * | 7/1981 | Palmieri ........................ 165/205 |
| 4,316,577 A | 2/1982 | Adams et al. |
| 4,460,125 A | 7/1984 | Barker et al. |
| 4,751,961 A | 6/1988 | Levine et al. |
| 4,768,706 A | 9/1988 | Parfitt |
| 5,005,365 A | 4/1991 | Lynch |
| 5,224,648 A | 7/1993 | Simon et al. |
| 5,294,047 A | 3/1994 | Schwer et al. |
| 5,395,042 A | 3/1995 | Riley et al. |
| 5,415,346 A | 5/1995 | Bishop |
| 5,460,327 A | 10/1995 | Hill et al. |

(Continued)

FOREIGN PATENT DOCUMENTS

| DE | 19609390 | 9/1997 |
| EP | 434926 | 7/1991 |

(Continued)

OTHER PUBLICATIONS

Digi X-Grid Device Partners Developer's Guide, Digi International, [retrieved on Nov. 6, 2012]. Retrieved from the Internet: <URL: https://doc-0g-94-docsviewer.googleusercontent.com/viewer/securedownload/dsn1aovipa7l8461sfcf94nedj8q2p4u/e99579ivh1m690fr43qed9d370c1a0n5/1354725000000/Ymw=/AGZ5hq8Bjb>, Oct. 18, 2010, 12 pages.

(Continued)

*Primary Examiner* — Charles Kasenge
(74) *Attorney, Agent, or Firm* — Kilpatrick Townsend & Stockton LLP

(57) ABSTRACT

A thermostat management system facilitates an automatic pairing of a thermostat with a thermostat communication account. The thermostat management system receives a public network address associated with a computer device on a private network accessing the thermostat management account. The system retrieves the thermostat metadata including a public network address associated with a registration of the thermostat with the thermostat management system. The public network address registered with the thermostat metadata is provided by a router on the private network and therefore should match the public network address used by computer devices on the private network. The thermostat management account is paired with the thermostat if the thermostat has the same public network address as the computer device accessing the thermostat management account. Pairing the thermostat management account to the thermostat allows the thermostat management account to communicate with the thermostat over the public network through the thermostat management system.

20 Claims, 26 Drawing Sheets

(56) References Cited

U.S. PATENT DOCUMENTS

| | | |
|---|---|---|
| 5,482,209 A | 1/1996 | Cochran et al. |
| 5,485,954 A | 1/1996 | Guy et al. |
| 5,555,927 A | 9/1996 | Shah |
| 5,566,879 A * | 10/1996 | Longtin .................. 236/46 R |
| 5,603,451 A | 2/1997 | Helander et al. |
| 5,627,531 A | 5/1997 | Posso et al. |
| 5,673,850 A | 10/1997 | Uptegraph |
| 5,808,602 A | 9/1998 | Sellers |
| 5,931,378 A | 8/1999 | Schramm |
| 5,973,662 A | 10/1999 | Singers et al. |
| 6,020,881 A | 2/2000 | Naughton et al. |
| 6,032,867 A | 3/2000 | Dushane et al. |
| 6,098,893 A | 8/2000 | Berglund et al. |
| 6,122,603 A | 9/2000 | Budike, Jr. |
| 6,164,374 A | 12/2000 | Rhodes et al. |
| 6,206,295 B1 | 3/2001 | LaCoste |
| 6,213,404 B1 | 4/2001 | Dushane et al. |
| 6,286,764 B1 | 9/2001 | Garvey et al. |
| 6,298,285 B1 | 10/2001 | Addink et al. |
| 6,453,687 B2 | 9/2002 | Sharood et al. |
| 6,502,758 B2 | 1/2003 | Cottrell |
| 6,513,723 B1 | 2/2003 | Mueller et al. |
| 6,519,509 B1 | 2/2003 | Nierlich et al. |
| D471,825 S | 3/2003 | Peabody |
| 6,619,055 B1 | 9/2003 | Addy |
| 6,622,925 B2 * | 9/2003 | Carner et al. ............... 236/46 R |
| 6,644,557 B1 | 11/2003 | Jacobs |
| 6,789,739 B2 * | 9/2004 | Rosen .......................... 236/51 |
| 6,798,341 B1 | 9/2004 | Eckel et al. |
| 6,851,621 B1 | 2/2005 | Wacker et al. |
| D503,631 S | 4/2005 | Peabody |
| 6,891,838 B1 | 5/2005 | Petite et al. |
| 6,909,921 B1 | 6/2005 | Bilger |
| 6,951,306 B2 | 10/2005 | DeLuca |
| 7,000,849 B2 | 2/2006 | Ashworth et al. |
| 7,038,667 B1 | 5/2006 | Vassallo et al. |
| 7,055,759 B2 | 6/2006 | Wacker et al. |
| 7,083,109 B2 | 8/2006 | Pouchak |
| 7,108,194 B1 | 9/2006 | Hankins, II |
| 7,114,554 B2 | 10/2006 | Bergman et al. |
| 7,135,965 B2 | 11/2006 | Chapman, Jr. et al. |
| 7,141,748 B2 | 11/2006 | Tanaka et al. |
| 7,159,790 B2 | 1/2007 | Schwendinger et al. |
| 7,222,800 B2 | 5/2007 | Wruck |
| 7,258,280 B2 | 8/2007 | Wolfson |
| 7,264,175 B2 | 9/2007 | Schwendinger et al. |
| 7,287,709 B2 | 10/2007 | Proffitt et al. |
| 7,289,887 B2 | 10/2007 | Rodgers |
| 7,299,996 B2 | 11/2007 | Garrett et al. |
| 7,333,880 B2 | 2/2008 | Brewster et al. |
| D566,587 S | 4/2008 | Rosen |
| 7,427,926 B2 | 9/2008 | Sinclair et al. |
| 7,434,742 B2 | 10/2008 | Mueller et al. |
| 7,451,937 B2 | 11/2008 | Flood et al. |
| 7,455,240 B2 | 11/2008 | Chapman, Jr. et al. |
| 7,460,690 B2 | 12/2008 | Cohen et al. |
| 7,469,550 B2 | 12/2008 | Chapman, Jr. et al. |
| 7,509,753 B2 | 3/2009 | Nicosia et al. |
| 7,537,171 B2 | 5/2009 | Mueller et al. |
| 7,555,364 B2 | 6/2009 | Poth et al. |
| 7,558,648 B2 | 7/2009 | Hoglund et al. |
| 7,565,813 B2 * | 7/2009 | Pouchak ...................... 62/126 |
| 7,571,865 B2 | 8/2009 | Nicodem et al. |
| 7,575,179 B2 | 8/2009 | Morrow et al. |
| 7,584,899 B2 | 9/2009 | de Pauw et al. |
| 7,600,694 B2 | 10/2009 | Helt et al. |
| D603,277 S | 11/2009 | Clausen et al. |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,693,582 B2 | 4/2010 | Bergman et al. |
| 7,702,424 B2 | 4/2010 | Cannon et al. |
| 7,703,694 B2 | 4/2010 | Mueller et al. |
| D614,976 S | 5/2010 | Skafdrup et al. |
| 7,726,581 B2 | 6/2010 | Naujok et al. |
| 7,845,576 B2 | 12/2010 | Siddaramanna et al. |
| 7,890,195 B2 | 2/2011 | Bergman et al. |
| 7,900,849 B2 | 3/2011 | Barton et al. |
| 7,904,209 B2 | 3/2011 | Podgorny et al. |
| 7,904,830 B2 | 3/2011 | Hoglund et al. |
| 8,037,022 B2 | 10/2011 | Rahman et al. |
| D651,529 S | 1/2012 | Mongell et al. |
| 8,131,207 B2 | 3/2012 | Hwang et al. |
| 8,195,313 B1 | 6/2012 | Fadell et al. |
| 8,196,185 B2 * | 6/2012 | Geadelmann et al. ............ 726/4 |
| 8,239,922 B2 * | 8/2012 | Sullivan et al. .................. 726/4 |
| 8,280,536 B1 | 10/2012 | Fadell et al. |
| 8,442,695 B2 | 5/2013 | Imes et al. |
| 8,550,368 B2 * | 10/2013 | Butler et al. ................ 236/1 E |
| 2002/0005435 A1 | 1/2002 | Cottrell |
| 2003/0034898 A1 | 2/2003 | Shamoon et al. |
| 2003/0040279 A1 * | 2/2003 | Ballweg ........................ 455/66 |
| 2003/0112262 A1 | 6/2003 | Adatia et al. |
| 2003/0150927 A1 * | 8/2003 | Rosen ............................ 236/51 |
| 2003/0231001 A1 | 12/2003 | Bruning |
| 2003/0233454 A1 | 12/2003 | Alkhatib et al. |
| 2004/0034484 A1 | 2/2004 | Solomita, Jr. et al. |
| 2004/0095237 A1 | 5/2004 | Chen et al. |
| 2004/0256472 A1 | 12/2004 | DeLuca |
| 2005/0043907 A1 | 2/2005 | Eckel et al. |
| 2005/0053063 A1 | 3/2005 | Madhavan |
| 2005/0055432 A1 | 3/2005 | Rodgers |
| 2005/0090915 A1 | 4/2005 | Geiwitz |
| 2005/0119793 A1 | 6/2005 | Amundson et al. |
| 2005/0159847 A1 | 7/2005 | Shah et al. |
| 2005/0194456 A1 | 9/2005 | Tessier et al. |
| 2005/0204997 A1 | 9/2005 | Fournier |
| 2006/0147003 A1 | 7/2006 | Archacki et al. |
| 2006/0206220 A1 | 9/2006 | Amundson |
| 2007/0001830 A1 | 1/2007 | Dagci et al. |
| 2007/0012052 A1 * | 1/2007 | Butler et al. .................... 62/181 |
| 2007/0045430 A1 | 3/2007 | Chapman et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0084941 A1 | 4/2007 | de Pauw et al. |
| 2007/0114295 A1 | 5/2007 | Jenkins |
| 2007/0115902 A1 | 5/2007 | Shamoon et al. |
| 2007/0158442 A1 | 7/2007 | Chapman et al. |
| 2007/0173978 A1 | 7/2007 | Fein et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0099568 A1 | 5/2008 | Nicodem et al. |
| 2008/0215240 A1 | 9/2008 | Howard et al. |
| 2008/0221737 A1 * | 9/2008 | Josephson et al. ............ 700/276 |
| 2008/0245480 A1 | 10/2008 | Knight et al. |
| 2008/0290183 A1 | 11/2008 | Laberge et al. |
| 2009/0001180 A1 | 1/2009 | Siddaramanna et al. |
| 2009/0057424 A1 * | 3/2009 | Sullivan et al. .................. 236/51 |
| 2009/0057425 A1 * | 3/2009 | Sullivan et al. .................. 236/51 |
| 2009/0057426 A1 * | 3/2009 | Sullivan et al. .................. 236/51 |
| 2009/0057427 A1 * | 3/2009 | Geadelmann et al. ........... 236/51 |
| 2009/0057428 A1 * | 3/2009 | Geadelmann et al. ........... 236/51 |
| 2009/0062964 A1 * | 3/2009 | Sullivan et al. ............... 700/276 |
| 2009/0140056 A1 | 6/2009 | Leen |
| 2009/0140057 A1 | 6/2009 | Leen |
| 2009/0140060 A1 | 6/2009 | Stoner et al. |
| 2009/0140064 A1 | 6/2009 | Schultz et al. |
| 2009/0143916 A1 | 6/2009 | Boll et al. |
| 2009/0194601 A1 | 8/2009 | Flohr |
| 2009/0261174 A1 | 10/2009 | Butler et al. |
| 2009/0283603 A1 | 11/2009 | Peterson et al. |
| 2010/0058450 A1 | 3/2010 | Fein et al. |
| 2010/0063832 A1 * | 3/2010 | Brown ............................ 705/1 |
| 2010/0084482 A1 | 4/2010 | Kennedy et al. |
| 2010/0163633 A1 | 7/2010 | Barrett et al. |
| 2010/0168924 A1 | 7/2010 | Tessier et al. |
| 2010/0198425 A1 | 8/2010 | Donovan |

(56) References Cited

U.S. PATENT DOCUMENTS

| | | |
|---|---|---|
| 2010/0211224 A1 | 8/2010 | Keeling et al. |
| 2010/0273610 A1 | 10/2010 | Johnson |
| 2010/0289643 A1 | 11/2010 | Trundle et al. |
| 2010/0318227 A1 | 12/2010 | Steinberg et al. |
| 2011/0001812 A1 | 1/2011 | Kang et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0022242 A1 | 1/2011 | Bukhin et al. |
| 2011/0029488 A1 | 2/2011 | Fuerst et al. |
| 2011/0046806 A1 | 2/2011 | Nagel et al. |
| 2011/0054710 A1 | 3/2011 | Imes et al. |
| 2011/0077758 A1 | 3/2011 | Tran et al. |
| 2011/0078675 A1 | 3/2011 | Van Camp et al. |
| 2011/0151837 A1 | 6/2011 | Winbush, III |
| 2011/0282937 A1 | 11/2011 | Deshpande et al. |
| 2012/0005590 A1 | 1/2012 | Lombard et al. |
| 2012/0101637 A1 | 4/2012 | Imes et al. |
| 2012/0130546 A1 | 5/2012 | Matas et al. |
| 2012/0252430 A1 | 10/2012 | Imes et al. |

FOREIGN PATENT DOCUMENTS

| | | |
|---|---|---|
| EP | 720077 | 7/1996 |
| EP | 802471 | 10/1997 |
| EP | 1065079 | 1/2001 |
| EP | 1731984 | 12/2006 |
| EP | 2157492 | 2/2010 |
| GB | 2212317 | 5/1992 |
| JP | 59106311 | 6/1984 |
| JP | 09298780 | 11/1997 |
| JP | 10023565 | 1/1998 |
| JP | 2002087050 | 3/2002 |
| JP | 2003054290 | 2/2003 |
| NL | 1024986 | 6/2005 |
| WO | 0248851 | 6/2002 |
| WO | 2008054938 | 5/2008 |
| WO | 2009073496 | 6/2009 |
| WO | 2011128416 | 10/2011 |

OTHER PUBLICATIONS

Energy Joule, Ambient Devices, 2011, [retrieved on Aug. 1, 2012]. Retrieved from: http://web.archive.org/web/20110723210421/http://www.ambientdevices.com/products/energyjoule.html, 3 pages.

Honeywell CT2700, An Electronic Round Programmable Thermostat—User's Guide, Honeywell, Inc., 1997, 8 pages.

Honeywell CT8775A,C, The digital Round Non-Programmable Thermostats—Owner's Guide, Honeywell International Inc., 2003, 20 pages.

Honeywell T8700C, An Electronic Round Programmable Thermostat—Owner's Guide, Honeywell, Inc., 1997, 12 pages.

Honeywell T8775 The Digital Round Thermostat, Honeywell, 2003, 2 pages.

Honeywell T8775AC Digital Round Thermostat Manual No. 69-1679EF-1, www.honeywell.com/yourhome, Jun. 2004, pp. 1-16.

ICY 3815TT-001 Timer-Thermostat Package Box, ICY BV Product Bar Code No. 8717953007902, 2009, 2 pages.

Introducing the New Smart Si Thermostat, Datasheet [online]. Ecobee, Mar., 2012 [retrieved on Feb. 25, 2013]. Retrieved from the Internet: <URL: https://www.ecobee.com/solutions/home/smart-si/>, Mar. 12, 2012, 4 pages.

The Clever Thermostat, ICY BV Web Page, http://www.icy.nl/en/consumer/products/clever-thermostat, ICY BV, 2012, 1 page.

The Clever Thermostat User Manual and Installation Guide, ICY BV ICY3815 Timer-Thermostat, 2009, pp. 1-36.

U.S. Appl. No. 60/512,886, Volkswagen Rotary Knob for Motor Vehicle—English Translation of German Application filed Oct. 20, 2003.

Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposterpdf, 2005, 1 page.

Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, 2004, 1 page.

Arens et al., "Demand Response Enabling Technology Development", Phase I Report: Jun. 2003-Nov. 2005, Jul. 27, P:/DemandRes/UC Papers/DR-Phase1Report-Final DraftApril24-26.doc, University of California Berkeley, pp. 1-108.

Arens et al., "New Thermostat Demand Response Enabling Technology", Poster, University of California Berkeley, Jun. 10, 2004.

Auslander et al., "UC Berkeley DR Research Energy Management Group", Power Point Presentation, DR ETD Workshop, State of California Energy Commission, Jun. 11, 2007, pp. 1-35.

Bourke, "Server Load Balancing", O'Reilly & Associates, Inc., Aug. 2001, 182 pages.

Chen et al., "Demand Response-Enabled Residential Thermostat Controls", Abstract, ACEEE Summer Study on Energy Efficiency in Buildings, Mechanical Engineering Dept. and Architecture Dept., University of California Berkeley, 2008, pp. 1-24 through 1-36.

Green, "Thermo Heat Tech Cool", Popular Mechanics Electronic Thermostat Guide, Oct. 1985, pp. 155-158.

Meier et al., "Thermostat Interface Usability: A Survey", Ernest Orlando Lawrence Berkeley National Laboratory, Environmental Energy Technologies Division, Berkeley California, Sep. 2010, pp. 1-73.

International Patent Application No. PCT/US2012/059116, International Search Report & Written Opinion, mailed Jan. 22, 2013, 11 pages.

Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.

Peffer et al., "Smart Comfort At Home: Design of a Residential Thermostat to Achieve Thermal Comfort, and Save Money and Peak Energy", University of California Berkeley, Mar. 2007, 1 page.

Salus, "S-Series Digital Thermostat Instruction Manual—ST620 Model No. Instruction Manual", www.salus-tech.com, Version 005, Apr. 29, 2010, 24 pages.

Sanford, "iPod (Click Wheel) (2004)", www.apple-history.com [retrieved on Apr. 9, 2012]. Retrieved from: http://apple-history.com/ipod, Apr. 9, 2012, 2 pages.

White et al., "A Conceptual Model for Simulation Load Balancing", Proc. 1998 Spring Simulation Interoperability Workshop, 1998, 7 pages.

Wright et al., "DR ETD—Summary of New Thermostate, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.

\* cited by examiner

METHODS, SYSTEMS, AND RELATED ARCHITECTURES FOR MANAGING NETWORK CONNECTED THERMOSTATS

(1) CROSS-REFERENCE TO RELATED APPLICATIONS

The subject matter of this patent specification relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 61/415,771 filed Nov. 19, 2010; U.S. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666, U.S. Ser. No. 13/034,674 and U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501 filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; and U.S. Ser. No. 29/404,105 filed Oct. 14, 2011. The subject matter of this patent specification further relates to the subject matter of the following commonly assigned applications being filed on the same day as the present application: U.S. Ser. No. 13/275,311, "Methods, Systems, And Related Architectures For Managing Network Connected Thermostats"; U.S. Ser. No. 13/275,307, "Methods And Systems For Data Interchange Between A Network-Connected Thermostat And A Cloud-Based Management Server". Each of the above-referenced patent applications is incorporated by reference herein. The above-referenced patent applications are collectively referenced hereinbelow as "the commonly assigned incorporated applications."

(2) TECHNICAL FIELD

This patent specification relates to system monitoring and control, such as the monitoring and control of heating, ventilation, and air conditioning (HVAC) systems. More particularly, this patent specification relates to methods, systems and related computer program products for provisioning, supporting, maintaining, and/or remotely controlling one or more network-connected thermostats.

(3) BACKGROUND

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

It would be beneficial, at both a societal level and on a per-home basis, for a large number of homes to have their existing older thermostats replaced by newer, microprocessor controlled "intelligent" thermostats having more advanced HVAC control capabilities that can save energy while also keeping the occupants comfortable. To do this, these thermostats will need more information from the occupants as well as the environments where the thermostats are located. Preferably, these thermostats will also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

Among other requirements, the successful implementation of intelligent network-connected thermostats into widespread, practical everyday use in a large number of homes and business requires the deployment of computers, networks, software systems and other network infrastructure capable of providing the necessary provisioning, data management, and support. Data communications methods between the intelligent thermostats and centrally provided management servers (which can also be termed "cloud-based" management servers), needs to be responsive, robust, and scalable. At the same time, the hardware and methodologies employed need to be compatible with, and workable in view of, a large installed base of conventional routers and network services that are already in homes and business, such that widespread adoption of the network-connected intelligent thermostats be commercially feasible.

One further issue that needs to be addressed in promoting the adoption of intelligent network-connected thermostats relates to the level of sophistication and effort required to install, configure, and manage such thermostats. As the benefits of these intelligent thermostats are realized, a broad range of individuals and businesses will inevitably be interested in their adoption. People calculating the reduced costs and energy savings might be ready to purchase such a device yet may hesitate when it comes to installation, configuration, and management. Some may wonder whether they will be able to follow the instructions provided in the installation and user manual provided with the thermostat. Adding a network connection to the thermostat device can further complicate matters if the users are not adept in computers and networking.

To overcome these and other associated issues, it is important that the intelligent thermostat is easily installed, configured, and managed. Complex installation instructions with numerous steps should be avoided as they might be confusing to a large number of users and prevent the intelligent thermostat from being installed or set up correctly. Installation problems may also arise if the installation requires a user to enter numerous codes and network addresses on the intelligent thermostat and/or other pieces of equipment. Instead, the intelligent thermostat installation and configuration should be achievable even by a user with limited experience and knowledge in "tech".

One further issue that needs to be addressed in promoting the adoption of intelligent network-connected thermostats relates to the human-machine interface the will be experienced by the user when interacting with such thermostats. It would be desirable to provide intelligent network-connected thermostat and an associated cloud-based provisioning, management, and control system therefor that not only saves energy, but that also provides a user-friendly, intuitive, pleasant, and appealing experience for the user. In addition to providing such positive and compelling experiences directly at the user interface of the physical thermostat itself (i.e., the "walk-up" user interface), it would be desirable to provide such positive and compelling user experiences when the user is interacting remotely with their network-connected thermostat over a computer network using their computer web browser, smartphone, tablet computer, or other remote access device.

It is to be appreciated that although exemplary embodiments are presented herein for the particular context of HVAC system control, there are a wide variety of other resource usage contexts for which the embodiments are readily applicable including, but not limited to, water usage, air usage, the usage of other natural resources, and the usage of other (i.e., non-HVAC-related) forms of energy, as would be apparent to the skilled artisan in view of the present disclosure. Therefore, such application of the embodiments in such other resource usage contexts is not outside the scope of the present teachings.

SUMMARY

Aspects of the present invention provide methods, systems and related architectures for facilitating the provisioning, installation, configuration, control, and/or management of a network-connected thermostat. In one preferred embodiment, there is provided a method for secure automated association or "pairing" of a wirelessly communicating thermostat with a user account on a cloud-based thermostat management system in a manner that reduces or minimizes an amount of user effort involved. Upon first installation and power-up of the thermostat (or subsequently thereto, such as for a re-installation or factory reset), the thermostat automatically instantiates wireless connection to an integrated router associated with a local area network ("private network router") that serves the home, business, or other structure ("enclosure") in which the thermostat is installed, the thermostat walking the user through wireless network selection (if multiple wireless networks are present) and wireless network security password entry (if required) by virtue of an intuitive user interface on the thermostat that includes an electronic display. The thermostat, which is located on a private network served by the private network router, is configured and programmed to then instantiate communication with the cloud-based thermostat management system, which is located on a public network such as the Internet. The cloud-based thermostat management system maintains a unique account identifier (such as an e-mail address) for each user account that has been created, and a unique thermostat identifier (such as a MAC address) for each thermostat unit that has been manufactured. In a method directed to pairing the newly installed thermostat with an associated user account with reduced or minimal user effort, the cloud-based thermostat management server keeps track, for each user account, of a public network address from which that user most recently accessed their user account on the cloud-based thermostat management server, such tracking being applicable for both previously established user accounts and newly established user accounts. Upon instantiation of communication with the cloud-based thermostat management system, the newly installed but as-yet unpaired thermostat ("pairing candidate thermostat") transmits thermostat metadata information associated therewith, including its unique thermostat identifier, to the cloud-based thermostat management server, this information being appended with the public network address of the private network router on its way out to the cloud-based thermostat management server. The cloud-based thermostat management server then makes a determination whether the pairing candidate thermostat can be automatically associated with a user account identifier, based on a comparison of (i) the public network address of the pairing candidate thermostat's private network router and (ii) the tracked public network addresses from which user accounts have recently been accessed. In the event there is a match between the public network address of the pairing candidate thermostat's private network router the public network address from which one user account has recently been accessed, than an automatic association is established between the unique thermostat identifier for that thermostat and the unique account identifier for that user account. In the event that there is no such match, or in the event that any of a plurality of predetermined safeguard methods or criteria are not met, then the user is prompted on the thermostat user interface display to manually assist in the pairing process. For the manual assistance process, the thermostat is provided with an easy-to-remember passcode from the cloud-based thermostat management server, and then displays that easy-to-remember pass code to the user on the thermostat display along with a request for the user to log into their user account on the cloud-based management server, or to establish their user account if one is not yet established, and then enter that passcode when so prompted. According to some embodiments, the predetermined safeguard methods or criteria include displaying the user account identifier (e.g., the user's e-mail address) on the thermostat display screen, and requesting an affirmative confirmation input from the user into the thermostat.

Thus, in one scenario that is expected to be relatively common, a user will drive home with their new thermostat, log into the cloud-based management server to establish an account (e.g., tomsmith3@mailhost.com) from a computing device in their home which connects to the Internet using the same wireless-capable router that the thermostat will be using, and then install and power up their thermostat. In this case, there will be a match between the public network address of their thermostat's private network router and the tracked public network addresses from which they established their user account, and so there will be an automated association or "pairing" of their new thermostat's unique thermostat identifier and their user account identifier on the cloud-based management server. During the initial setup process, the user will simply encounter a safeguard message on the thermostat display, such as "Connect to tomsmith3@mailhost.com?" and will readily provide a confirmatory input since they are familiar with their own e-mail address, and the pairing process will be complete. Advantageously, however, even in some less common or complex scenarios for which such automated pairing may not result in a match, or for which the predetermined safeguard methods or criteria are not met, the user will still be provided with a relatively simple manual assistance process to establish the pairing at the cloud-based management server as described above. According to some embodiments, the predetermined safeguard methods or criteria further include canceling any pairing associations (i.e., requiring manual assistance) in any of the following cases: (i) two different user accounts have been logged into from the same public network address now being used by the thermostat's private network router within the past 24 hours (or other suitable time window), and (ii) there are two different pairing candidate thermostats simultaneously accessing the cloud-based thermostat management server from the same public network address. Other heuristics or testing methods directed to detecting particular cases of ambiguity, mistake, or likely mismatch can optionally be applied as additional safeguards without departing from the scope of the present teachings.

According to another preferred embodiment, a method of configuring a thermostat for communication with a computer device over a network connection is provided. To connect the thermostat on the network, a user configures a wireless network interface controller associated with the thermostat connecting the thermostat to a private network (e.g., by entering a wireless passcode, selecting from plural available networks, etc.). A router on the private network provides connectivity from the thermostat to a public network where a thermostat management system is located. Once the thermostat is connected to its private network, the thermostat sends thermostat metadata to be registered with a thermostat identifier in a thermostat registration pool on the thermostat management system, the thermostat metadata being appended with the public network address of the router on its way to the thermostat management server. The public network address associated with the thermostat is shared by the router with other computer devices and thermostats located on the same private network. The thermostat management system pairs the thermostat registered in the thermostat registration pool to a thermostat management account on the thermostat management system when it is determined that the thermostat is on a same private network as a computer device that has recently accessed the thermostat management account. The pairing operation allows the thermostat to be accessed by the thermostat management account over the public network through the thermostat management system.

Another aspect of the present invention includes creating a thermostat management account on a thermostat management system to be used to communicate with a thermostat having network connectivity. In one embodiment, a thermostat access client running on a computer device on a private network accesses a thermostat management system on a public network. The thermostat access client requests the thermostat management system to provision a thermostat management account using an account name. The thermostat management account will be used to communicate with at least one thermostat registered on the thermostat management system. As part of the provisioning operation, the thermostat management system associates the public network address used by the computer device to access the thermostat management system from the private network. This public network address is used to identify thermostats on the same private network as the computer device and therefore suitable for pairing with the thermostat management account. As previously described, the same public network address is shared by the router with computer devices and thermostats located on the same private network. Once it is created, the thermostat management account on the thermostat management system may be paired to a thermostat on the same private network when the corresponding public network addresses match. Once again, the pairing operation allows the newly created thermostat management account to access and communicate with the thermostat through the thermostat management system.

Yet another aspect of the invention includes uses logic on the thermostat management system to automatically facilitate a pairing of the thermostat with the thermostat communication account. In one embodiment, the thermostat management system detects that a computer device on a private network has established or otherwise accessed a thermostat management account on the thermostat management system. For example, this may occur if a computer device executes a thermostat access client that accesses the thermostat management account. The thermostat management system receives a public network address associated with the computer device accessing the thermostat management account. Next, the thermostat management system retrieves thermostat metadata from the thermostat, which communication will include a public network address provided by a router on the private network associated the thermostat. An automated association or pairing between the thermostat management account and the thermostat is established if the public network address registered with the thermostat metadata matches the public network address used by other the computer device to access the thermostat management account. Accordingly, the thermostat management account is paired with the thermostat if a comparison indicates that the thermostat has the same public network address as the computer device accessing the thermostat management account. Pairing the thermostat management account to the thermostat allows the thermostat management account to communicate with the thermostat over the public network through the thermostat management system.

DETAILED DESCRIPTION OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

Figure 1:
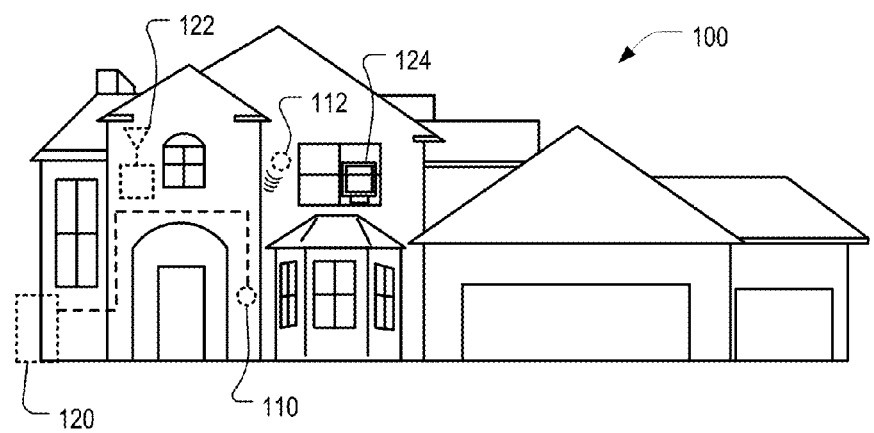
FIG. 1 is a diagram illustrating an exemplary enclosure using a thermostat implemented in accordance with embodiments of the present invention for controlling one or more environmental conditions.

FIG. 1 is a diagram illustrating an exemplary enclosure using intelligent thermostats (hereinafter thermostats) implemented in accordance with the present invention for controlling one or more environmental conditions. For example, enclosure 100 illustrates a single-family dwelling type of enclosure using an thermostat 110 for the control of heating and cooling provided by an HVAC system 120. Alternate embodiments of the present invention may be used with other types of enclosures including a duplex, an apartment within an apartment building, a light commercial structure such as an office or retail store, or a structure or enclosure that is a combination of these and other types of enclosures.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 and readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input. As used herein, a "primary" thermostat refers to a thermostat that is electrically connected to actuate all or part of an HVAC system, such as by virtue of electrical connection to HVAC control wires (e.g. W, G, Y, etc.) leading to the HVAC system. As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat. In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Other embodiments may instead use multiple discrete switches, routers and other devices (not shown) to perform networking functions equivalent to or in addition to those provided by integrated router 122.

Integrated router 122 further provides network devices access to a public network, such as the Internet, provided enclosure 100 has a connection to the public network generally through a cable-modem, DSL modem and a service provider of the Internet or other public network. The Internet and other public networks are sometimes referred to as a Wide-Area Network or WAN. In one embodiment, integrated router 122 may direct communications to other devices on these networks using a network protocol such as TCP/IP. If the communications is directed to a device or service outside the private network, integrated router 122 may route the communications outside the private network to the public network such as the Internet.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

In accordance with some embodiments, a computer device 124 in enclosure 100 may remotely control thermostat 110 by accessing a thermostat management account through a thermostat management system (not shown in FIG. 1) located on a public network such as the Internet. The thermostat management system passes control information over the network back to thermostat 110 provided the thermostat 110 is also associated or paired to the thermostat management account on the thermostat management system. Data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network and both the thermostat management system and thermostat management account. Further details on accessing the public network, such as the Internet, and a thermostat like thermostat 110 in accordance with embodiments of the present invention is described in further detail later herein.

Figure 2:
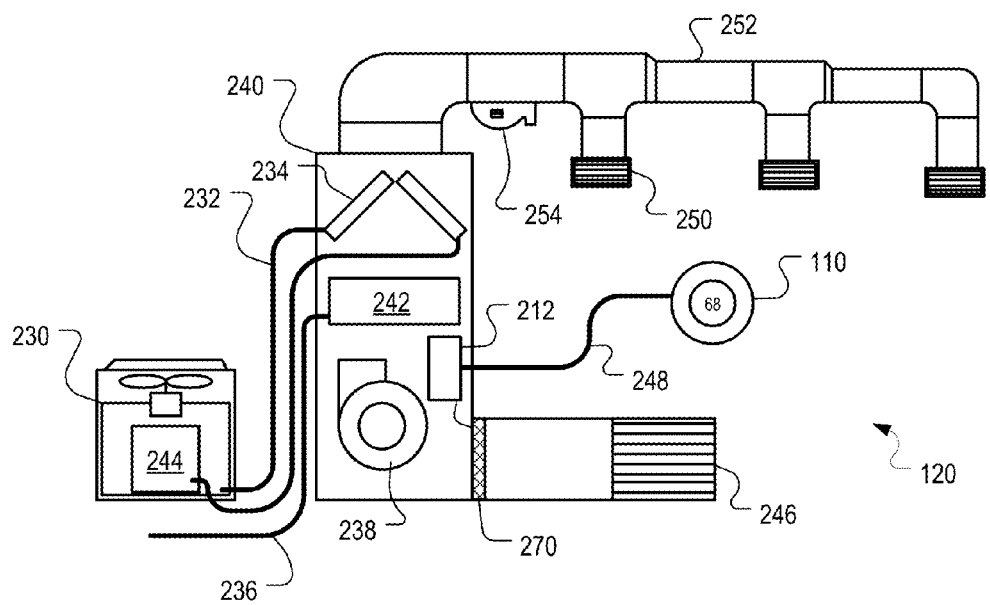
FIG. 2 is a schematic diagram of an HVAC system controlled using a thermostat designed in accordance with embodiments of the present invention.

FIG. 2 is a schematic diagram of an HVAC system controlled using a thermostat designed in accordance with embodiments of the present invention. HVAC system 120 provides heating, cooling, ventilation, and/or air handling for an enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils 244 to cool the gas. The gas then goes through line 232 to the cooling coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
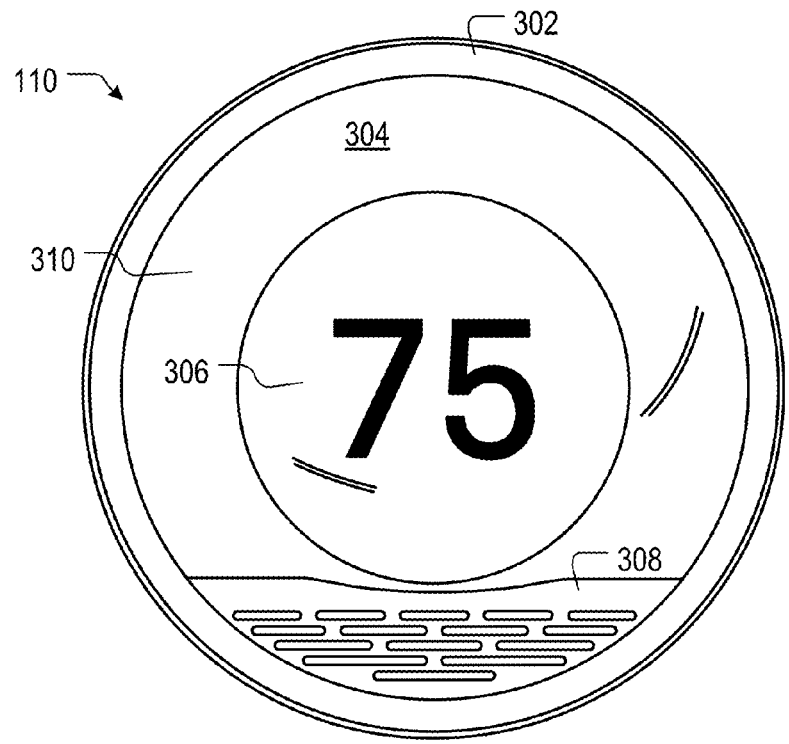
FIGS. 3A-3B illustrate a forward-facing surface and display of a thermostat designed in accordance with embodiments of the present invention.
Figure 3B:
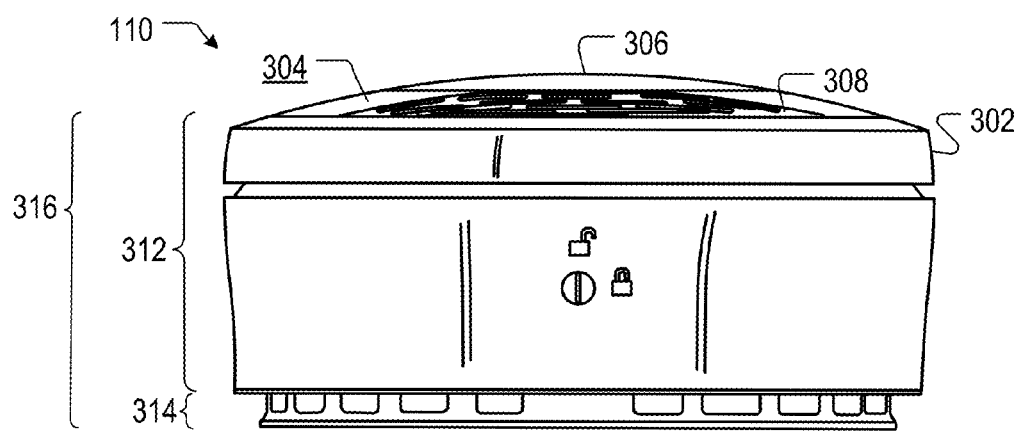

FIGS. 3A-3B illustrate a thermostat designed in accordance with embodiments of the present invention. Inside of thermostat 110 is control circuitry that electrically connects thermostat 110 to an HVAC system, such as HVAC system 120 shown in FIG. 1 and FIG. 2. A microprocessor (not shown) inside thermostat 110 is available to perform various computations including processing information related to the operation and control of HVAC system 120. To communicate, a network interface controller or NIC (not shown) is also provided within thermostat 110 enabling wireless or wired communication over a private network such as a LAN and public networks or wide area networks (WANs) such as the Internet.

In the embodiment illustrated, thermostat 110 is enclosed by housing 316 with a forward-facing surface including a cover 304 and a grille member 308. The grille member 308 is designed to compliment the sleek, simple, uncluttered and elegant design of thermostat 110 to while facilitating the integration and operation of sensors located within housing 316 of the thermostat. Notably, included in the thermostat according to some preferred embodiments is passive infrared (PIR) occupancy sensors and temperature sensors behind grille member 308. Additional sensors may also include an ambient light sensor (not shown) and an active proximity sensor (not shown) positioned near the top of the thermostat just behind the cover 304. Some embodiments of housing 316 include a backplate 314 and a head unit 312. Housing 316 provides an attractive and durable configuration for one or more integrated sensors used by thermostat 110 and contained therein.

A central display area 306 of cover 304 allows information related to the operation of the thermostat to be displayed while an outer area 310 of cover 304 may be made opaque using a paint or smoke finish. For example, central display area 306 may be used to display a current temperature as illustrated in FIG. 3A with the numerals, "75" indicating 75 degrees. Central display area 316 may also be used to display wireless networks available within enclosure 100 and present a user-interface for configuring thermostat 110 to select, access and use one of the wireless networks.

Embodiments of thermostat 110 are circular in shape and have an outer ring 312 for receiving user input. Side view of thermostat 110 in FIG. 3B further highlights this curved spherical shape of cover 304 and grille member 308 gently arcing outward matching the corresponding surface portion of outer ring 302. In some embodiments, the curvature of cover 304 may tend to magnify information displayed in central display area 306 thus making information easier to read by users. The shape of thermostat 110 not only provides a visually appealing accent when it is mounted on the wall but a natural shape for users to touch and adjust with their hands. Accordingly, the diameter of thermostat 110 may be approximately 80 mm or another diameter that readily fits the hand. In various embodiments, rotating outer ring 302 allows the user to make adjustments, such as selecting a new target temperature. For example, the target temperature may be increased by rotating the outer ring 302 clockwise and decreased by rotating the outer ring 302 counter-clockwise.

Figure 4A:
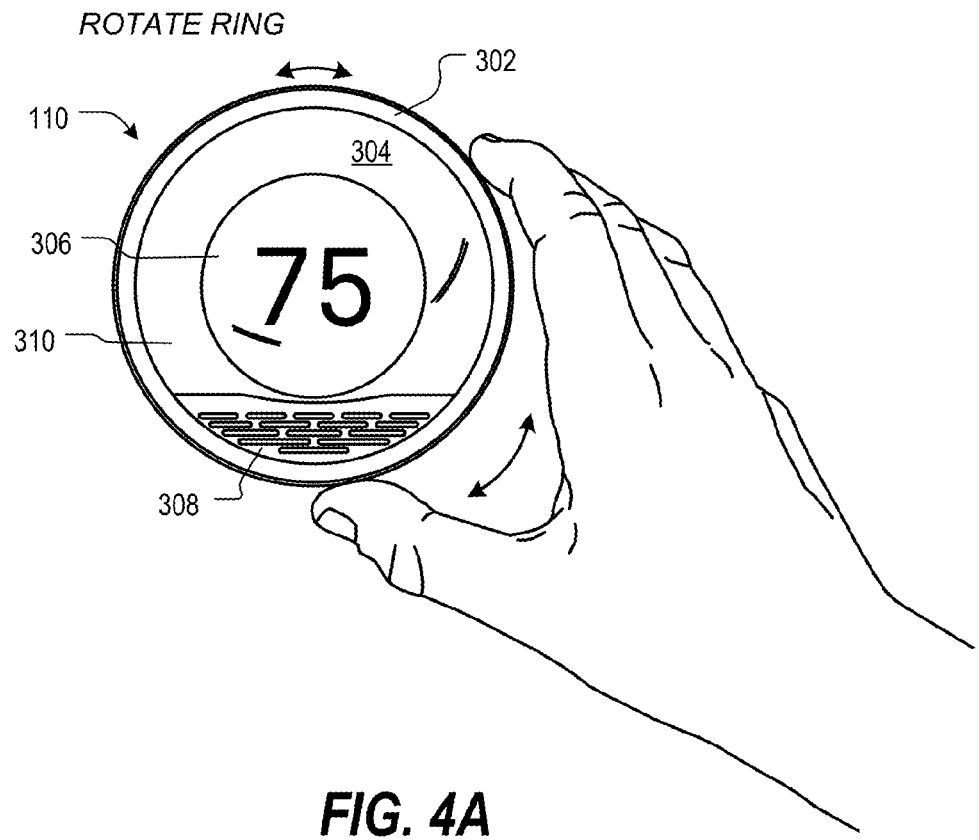
FIGS. 4A-B illustrate a user's hand controlling a thermostat designed in accordance with embodiments of the present invention.
Figure 4B:
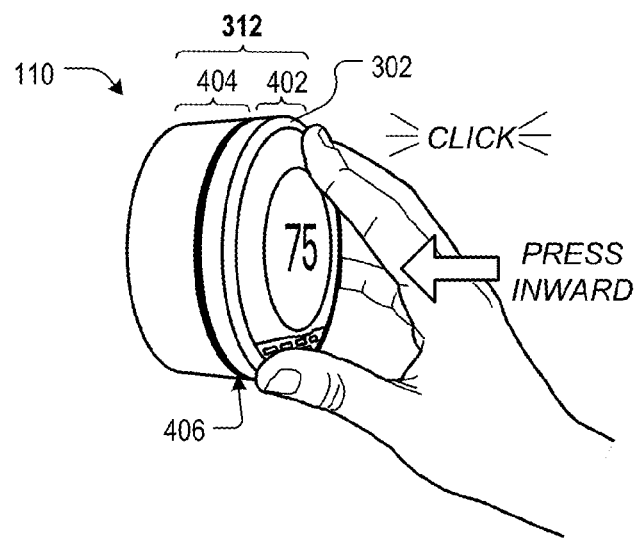

FIGS. 4A-B illustrate a user's hand controlling a thermostat designed in accordance with embodiments of the present invention. As illustrated, thermostat 110 is wall-mounted, circular in shape and has a rotatable outer ring 302 for receiving user input. Cover 304 on thermostat 110 includes central display area 306 for providing information and feedback to the user before, during and after operating thermostat 110. In some embodiments, outer area 310 of cover 304 delineates an area for the user to push or otherwise manipulate thermostat 110 and thus is made opaque with paint or smoke finish. Grille member 308 provides an additional area that the user may rest their hand while viewing or operating thermostat 110.

Head unit 312 of thermostat 110 slides onto backplate (not shown) and further includes head unit front 402 and head unit frame 404. The head unit front 402 includes outer ring 302, central display area 306 and outer area 310 of cover 304 and grille member 308 designed in accordance with embodiments of the present invention.

According to some embodiments, for the combined purposes of inspiring user confidence and further promoting visual and functional elegance, the thermostat 110 is controlled by only two types of user input, the first being a rotation of the outer ring 302 as illustrated in FIG. 4A (also referred to as a "rotate ring"), and the second being an inward push on the head unit front 402 until an audible and/or tactile "click" occurs as illustrated in FIG. 4B. According to some embodiments, the inward push illustrated in FIG. 4B only causes the outer ring 302 to move forward, while in other embodiments the entire head unit front 402 moves inwardly together when pushed. In some embodiments, cover 304 and grille member 308 do not rotate with outer ring 302.

According to some embodiments, multiple types of user input may be generated depending on the way a pushing inward of head unit front 402 is effectuated. In some embodiments a single brief push inward of head unit front 402 until the audible and/or tactile click occurs followed by a release (single click) can be interpreted as one type of user input (also referred to as an "inward click"). In other embodiments, pushing the head unit front 402 in and holding with an the inward pressure for an amount of time such as 1-3 seconds can be interpreted as another type of user input (also referred to as a "press and hold"). According to some further embodiments, other types of user input can be effectuated by a user such as double and/or multiple clicks, and pressing and holding for longer and/or shorter periods of time. According to other embodiments, speed-sensitive or acceleration-sensitive rotational inputs may also be implemented to create further types of user inputs (e.g., a very large and fast leftward rotation specifies an "Away" occupancy state, while a very large and fast rightward rotation specifies an "Occupied" occupancy state).

Figure 5:
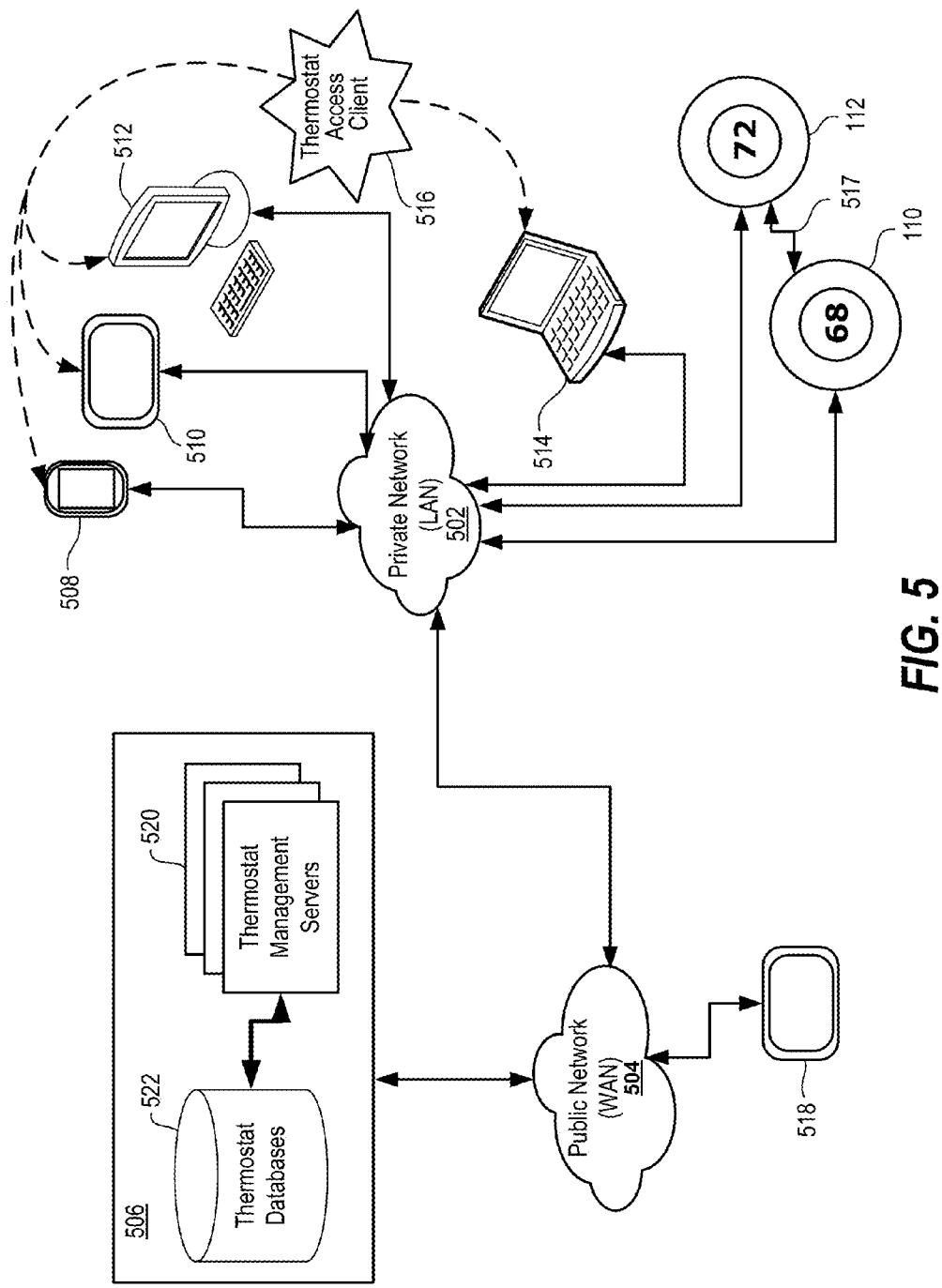
FIG. 5 illustrates thermostats and computer devices on a private network connected to a thermostat management system on a public network designed in accordance with embodiments of the present invention.

FIG. 5 illustrates thermostats and computers on a private network 502 connected to a cloud-based thermostat management system 506 (hereinafter simply "thermostat management system" 506) designed in accordance with embodiments of the present invention. In one embodiment, private network 502 is designed to provide network connectivity primarily within and near an enclosure, such as enclosure 100 in FIG. 1. Private network additionally provides network connectivity for various devices such a smartphone 508, tablet 510, computer 512, and laptop 514, as well as the thermostat 110 and remote thermostat 112. A router (not shown) in private network 502, such as integrated router 122 in FIG. 1, may provide wired and wireless connectivity for these devices using a network protocol such as TCP/IP. Preferably, thermostat 110 and remote thermostat 112 are connected wirelessly to private network 502, for at least the reason that wired connections to the locations of the thermostats may not available, or it may be undesirable to incorporate such physical connections in either thermostat 110 or remote thermostat 112. For some embodiments, it is also possible for thermostat 110 and remote thermostat 112 to communicate directly with each other and other devices wireless using an ad hoc network 517 preferably setup directly between the devices and bypassing private network 502.

The embodiments described herein are advantageously configured to be compatible with a large variety of conventional integrated routers that service a large population of homes and businesses. Thus, by way of example only and not by way of limitation, the router (not shown) that services the private network 502 of FIG. 5 can be, for example, a D-Link DIR-655 Extreme N Wireless Router, a Netgear WNDR3700 RangeMax Dual Band Wireless USB Gigabit Router, a Buffalo Technology Nfiniti WZR-HP-G300NH Wireless-N Router, an Asus RT-N16 Wireless Router, Cisco Linksys E4200 Dual Band Wireless Router, or a Cisco Linksys E4200 Dual Band Wireless Router. Without loss of generality, some descriptions further hereinbelow will refer to an exemplary scenario in which the thermostats 110/112 are used in a home environment. However, it is to be appreciated that the described embodiments are not so limited, and are applicable to use of such thermostat(s) in any of a variety of enclosures including residential homes, business, vacation homes, hotels, hotel rooms, industrial facilities, and generally anywhere there is an HVAC system to be controlled.

Thermostat access client 516 is a client application designed in accordance with aspects of the present invention to access the thermostat management system 506 over public network 504, which is a wide area network such as the Internet. Because thermostat access client 516 is designed to execute on different devices, multiple client applications may be developed using different technologies based on the requirements of the underlying device platform or operating system. In some cases, thermostat access client 516 may be implemented using a markup language such as HTML and related technologies displayed inside of a web-browser technology such as SAFARI®, FIREFOX®, or INTERNET EXPLORER®. In some embodiments, computer 512 may run thermostat access client 516 by navigating to a particular URL on the Internet and displaying web pages delivered from a web server hosted by thermostat management system 506

In yet another embodiment, thermostat access client 516 may be a stand-alone application or "app" designed to be downloaded and run on a specific device such as smartphone 508 or a tablet 510 device running the Apple iOS operating system, Android operating system, or others. Developers create these stand-alone applications using a set of application programming interfaces (APIs) and libraries provided by the device manufacturer packaged in software development toolkit or SDK. Once completed, the "app" is made available for download to the respective device through an application store or "app" store curated by the app store owners to promote quality, usability and customer satisfaction.

In one embodiment, thermostat management system 506 illustrated in FIG. 5 may be accessed over public network 504 by computer devices on private network 502 running thermostat access client 516. Thermostat access client 516 accesses a thermostat management account (not illustrated) provisioned by thermostat management system 506, on behalf of the computer devices, in order to access or control thermostat 110 or remote thermostat 112. In addition, a computer device on private network 502 such as computer 512 may use the thermostat access client 516 and thermostat management account on to gather data from thermostat 110 and remote thermostat 112.

Thermostat 110 and remote thermostat 112 may be accessed remotely from numerous different locations on the private network 502 or public network 504. As will be described in further detail hereinbelow, upon installation a thermostat such as thermostat 110 first registers with the thermostat management system 506 and then requests the thermostat management system create a pairing between the thermostat and a corresponding thermostat management account. Thereafter, a device such as a tablet 518 may be connected to public network 504 directly or through a series of other private networks (not shown) yet still access these thermostats, while outside the private network where they are located, by way of thermostat management system 520. In one embodiment, a tablet 518 running the Apple iOS operating system may remotely access to these thermostats through the thermostat management system 506 and thermostat management account using an iOS "app" version of thermostat access client 516. Pairing thermostats with the thermostat management account allows tablet 518 and other computer devices to remotely control, gather data, and generally interact with thermostats such as thermostat 110 and remote thermostat 112.

In one embodiment, thermostat management system 506 distributes the task of communication and control with the thermostats to one or more thermostat management servers 520. These thermostat management servers 520 may coordinate communication, manage access, process data and analyze results using data produced by thermostats such as thermostat 110 and remote thermostat 112. Intermediate and final results from computations on these servers 520, as well as raw data, may be stored temporarily or archived on thermostat databases 522 for future reference and use. Thermostat management servers 520 may also send a portion of the data along with control information, and more generally any of a variety of different kinds of information, back to thermostat 110 and remote thermostat 112. Results from the thermostat management servers 520 may also be stored in one or more thermostat databases 522 for subsequent access by a device such as tablet 518 running thermostat access client 516.

These thermostat management servers 520 each may perform one or several discrete functions, may serve as redundant fail-over servers for these different discrete functions or may share performance of certain discrete functions in tandem or in a cluster as well as other combinations performing more complex operations in parallel or distributed over one or more clusters of computers. In some embodiments, one of the thermostat management servers 520 may correspond directly to a physical computer or computing device while in other embodiments, the thermostat management servers 520 may be virtualized servers running on one or more physical computers under the control of a virtual machine computing environment such as provided by VMWARE of Palo Alto, Calif. or any other virtual machine provider. In yet another embodiment, the thermostat management servers 520 and thermostat databases 522 are provisioned from a "cloud" computing and storage environment such as the Elastic Compute Cloud or EC2 offering from Amazon.com of Seattle, Wash. In an EC2 solution, for example, the thermostat management servers 520 may be allocated according to processor cycles and storage requirements rather than according to a number of computers, either real or virtual, thought to be required for the task at hand.

Figure 6:
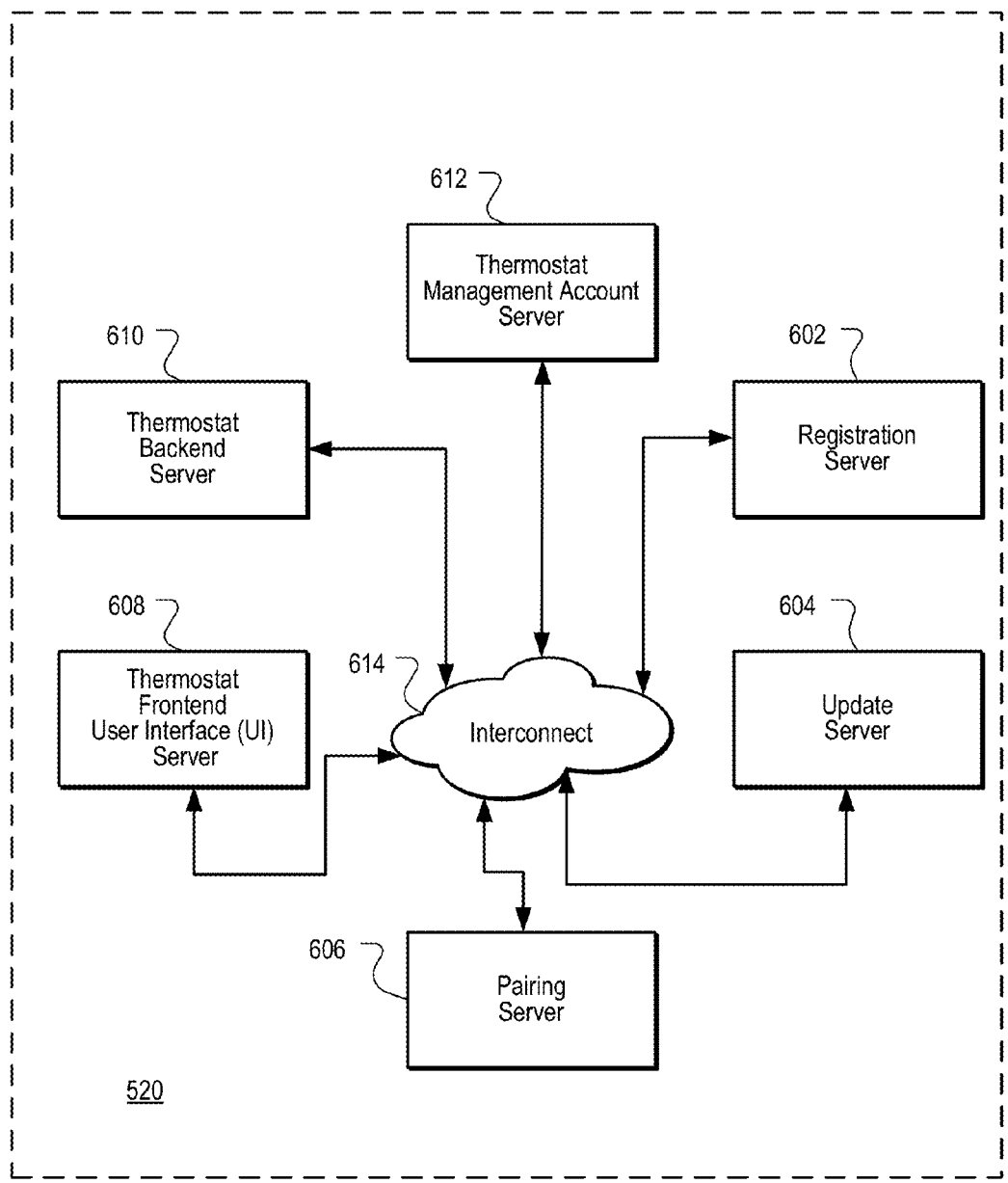
FIG. 6 illustrates a combination of thermostat management servers used to implement a thermostat management system designed in accordance with embodiments of the present invention.

FIG. 6 illustrates one combination of thermostat management servers 520 used to implement a thermostat management system 506 in accordance with the present invention. In one embodiment, the thermostat management system 506 includes a registration server 602, an update server 604, a pairing server 606, a thermostat frontend user interface (UI) server 608, a thermostat backend server 610, and a thermostat management account server 612. Interconnect 614 may connect servers using one or more high-speed network connections, a shared back plane, a combination of local and remote high-speed connections as well as one or more virtualized connections. While the configuration of thermostat management servers 520 is exemplary, it is should not be considered limiting in any way and it is contemplated that the distribution of functions may be handled through a different combination of servers and distribution of function over those servers.

In some embodiments, the thermostat management servers 520 making up this thermostat management system 506 may manage thermostats located in multiple enclosures across various geographic locations and time-zones. Each enclosure may use one or several thermostats in accordance with embodiments of the present invention to control one or several HVAC systems, such as HVAC system 120 in FIG. 1. In some cases, there may be an increased need from the thermostat management system 506 for certain functions and therefore more servers to deliver these functional capabilities. It may be appreciated that the design of thermostat management system 506 and use of the thermostat management servers 520 may be scaled to meet these demands on the system and efficiently track and organize the data from these multiple enclosures and thermostats for processing, analysis, control and machine-learning purposes.

One embodiment of registration server 602 provides a number of services related to registering a thermostat on the thermostat management system 506 and preparing it for pairing with a thermostat management account. In operation, the registration server 602 may be first accessed by a thermostat when the thermostat is wired to the HVAC of an enclosure and then connected to the Internet through a private network. To make the thermostat known on system 520, the thermostat sends thermostat metadata from the private network to the public network, such as the Internet, and then onto processing by registration server 602. Preferably, the thermostat metadata includes a unique thermostat identifier, such as one that is assigned at the time of manufacturing. As the communication that sends the thermostat metadata passes through the network address translator (NAT) of the router (not shown) that serves private network 502, it is appended with the public network address of that router, which is thus the public address that is "used" by the thermostat to communicate over the public network. The thermostat identifier is used to identify the thermostat from other thermostats being registered by registration server 602 and may be based, in part or in whole, on a media access control (MAC) address assigned to the NIC of the thermostat. As one security measure against registering unauthorized devices, registration server 602 may compare the MAC address in the thermostat metadata against a list of valid MAC addresses provided by the manufacturer of the thermostat or NIC component. In accordance with one embodiment, the thermostat registration is complete when the registration server 602 provisions an entry in a thermostat registration pool and marks the thermostat entry ready to be paired with a thermostat management account. Entries in the thermostat registration pool may be referenced by their unique thermostat identifier, the public network address that they used (or, more particularly, the public address of the private network router through which they connect to the Internet), and optionally other relevant metadata associated with the thermostat.

In some embodiments, update server 604 attempts to update software, firmware and configuration updates to each of the thermostats registered in the thermostat registration pool. If metadata from entries in the registration pool exclude versioning information, update server may need to further query each thermostat for current versions installed. Update server 604 may access entries in the registration pool and then use corresponding network addresses in each entry to connect to the associated thermostat over the public network or private network, or both.

If newer software versions exist than currently used on a thermostat, update server 604 proceeds to send software updates to the thermostat over the public network. For example, update server may use file transfer protocols such as ftp (file transfer protocol), tftp (trivial file transfer protocol) or more secure transfer protocols when uploading the new software. Once uploaded, installation and update of the software on the thermostat may occur immediately through an auto-update option on the thermostat or manually through the interface of the thermostat as requested by a user.

One embodiment of pairing server 606 facilitates the association or "pairing" of a thermostat with a thermostat management account on thermostat management account server 612. The term "thermostat management account" can be used interchangeably with "user account" herein unless specified otherwise. Once the thermostat is paired with a user account, a rich variety of network-enabled capabilities are enabled as described further herein and in one or more of the commonly assigned incorporated applications, supra. For example, once pairing has been achieved, a person with access to the thermostat management account may access the thermostat (through the thermostat management system 506 using the thermostat access client 516) for a variety of purposes such as seeing the current temperature of the home, changing the current setpoint, changing the mode of the thermostat between "home" and "away", and so forth. Moreover, the thermostat management system 506 can then start tracking the various information provided by the thermostat which, in turn, enables a rich variety of cloud-based data aggregation and analysis that can be used to provide relevant reports, summaries, updates, and recommendations to the user either through the thermostat display itself, through the thermostat access client 516, or both. A variety of other capabilities, such as demand-response actions in which the thermostat management server sends an energy alert and/or sends energy-saving setpoint commands to the thermostats of users who have enrolled in such programs, can be carried out.

In view of the importance of establishing a pairing between the thermostat and a thermostat management account, there is provided an ability for a fallback method of pairing, which can be termed a "manually assisted" method of pairing, that can take effect and be carried out in the event that the convenient auto-pairing methods described further hereinbelow cannot be securely and reliably carried out for a particular installation. The manually assisted method, which is described further in relation to FIG. 9F infra, pairing server 606 may use an alphanumeric "passcode" to pair the thermostat to the thermostat management account. Typically, the passcode is sent to the thermostat over a public network, like the Internet, and displayed on the display area of the thermostat. Authorization to access the thermostat is provided if the user obtaining the passcode from the display on the thermostat then enters it into a pairing dialog presented when the user logs into their thermostat management account. Pairing server 606 pairs the thermostat with the user's thermostat management account if the user enters that same passcode that was displayed on their thermostat display.

According to a preferred "auto-pairing" method, the pairing server 606 may automatically pair or "auto-pair" a thermostat management account to a thermostat if both are located on the same private network. If the thermostat and thermostat management account are associated with the same private network, embodiments of the present invention presume the thermostat is at the user's home, office, or other area where the user should also have control of the device. To make this determination automatically, the pairing server 606 compares the public network address that was used to register the thermostat over the Internet with the public network address used by the computer device that has most recently been used to access the thermostat management account. Since the thermostat and computer device only have private network addresses, the router on the private network they share inserts the same public network address into their packets thus allowing the two devices to access servers, services, and other devices on the Internet. "Auto-pairing" takes advantage of this fact and automatically pairs devices sharing the same public network address. This is particularly advantageous from a user standpoint in that the user is not bothered with the need to enter a passcode or other alphanumerical identifier in order to achieve the pairing process, and avoids the concern that a user may inadvertently enter incorrect codes or identifiers into the system. Details on auto-pairing and manually assisted pairing are described in further detail later herein.

Thermostat front end user-interface (UI) server 608 facilitates the generation and presentation of intuitive, user-friendly graphical user-interfaces that allow users to remotely access, configure, interact with, and control one or more of their network-connected thermostats 110/112 from a computer web browser, smartphone, tablet, or other computing device. The user-friendly graphical user-interfaces can also provide useful tools and interfaces that do not necessarily require real-time connectivity with the thermostats 110/112 with examples including, for some embodiments, providing user interfaces for displaying historical energy usage, historical sensor readings and/or occupancy patterns, allowing the user to learn about and/or enroll in demand-response programs, provide social networking forums that allow users to interact with each other in informative, competitive, fun ways that promote energy savings, provide access to local information including weather, public safety information, neighborhood calendar events, and local blogs, and more generally provide services and information associated with a comprehensive "energy portal" functionality. Examples of intuitive, user-friendly graphical user-interfaces provided by the UI server 608 according to one or more preferred embodiments are described further infra with respect to FIGS. 10A-12C.

In some embodiments, a thermostat access client user-interface displays an image of a house representing a primary enclosure paired to the thermostat management account in the thermostat management system. Thermostat front end UI server 608 may further instruct the thermostat access client, such as thermostat access client 516 in FIG. 5, to display images visually representative of one or more thermostats 110/112 inside the primary enclosure. By default, each of the one or more thermostat images may also display a current temperature measurement in the enclosure. In some embodiments, the user-interface may also further display an image of an additional house, or houses, representing a secondary enclosure having additional thermostats that are also paired to the thermostat management account. The image of the additional house may appear smaller, out of focus or generally deemphasized visually in relationship to the image of the house representing the primary enclosure. Additional enclosures beyond the secondary enclosure can also be displayed in the user interface and should also appear visually deemphasized compared with the image displayed for the primary enclosure. Further information on the thermostat access client and user-interface are described in more detail hereinbelow.

Thermostat backend server 610 manages the storage of data used by various thermostat management servers in the thermostat management system 506. In some embodiments, thermostat backend server 610 may manage storage of the thermostat registration pool data used by the registration server 602 or may organize and store new software updates and releases for the update server 604. In another embodiment, thermostat backend server 610 may also store heating and cooling related data (i.e., date and time HVAC system was in either heating or cooling mode within the enclosure), sensor information, battery-level data, alarms, etc. associated with an enclosure that was sent to the thermostat management system 506 by thermostats registered therewith, and in some embodiments and provide pre-computed heating and cooling schedules, applications, and other data for download over the public network for use by the thermostats.

In some embodiments, thermostat management account server 612 is used to create new accounts and update existing accounts on thermostat management system 506. To access their thermostat over a thermostat access client 516 and enjoy the benefits of thermostat connectedness, the user is first required to create of a thermostat management account ("user account") on thermostat management account server 612 using their thermostat access client 516. Accordingly, users execute the thermostat access client 516 on a computer or other computer device to access the thermostat management account server 612. The thermostat management account server 612 should receive at least the zip code and/or city and state for the enclosure in which the thermostat is (or will be) installed, such that weather information provided by a weather service can be accessed and downloaded to the thermostat, which can be used as part of its optimal enclosure characterization and HVAC control algorithms. Optionally, a variety of other information including a user's contact information, enclosure street addresses, and so forth can also be received. Primary options associated with the thermostat management account server 612 include pairing one or more thermostats to the correct thermostat management account through pairing operations provided by pairing server 606. However, even if the account is not yet paired with a thermostat, the user may use the thermostat management account to access local information including weather, public safety information, neighborhood calendar events, local blogs and more information based upon the user's contact information, locale and other interests.

Figure 7:
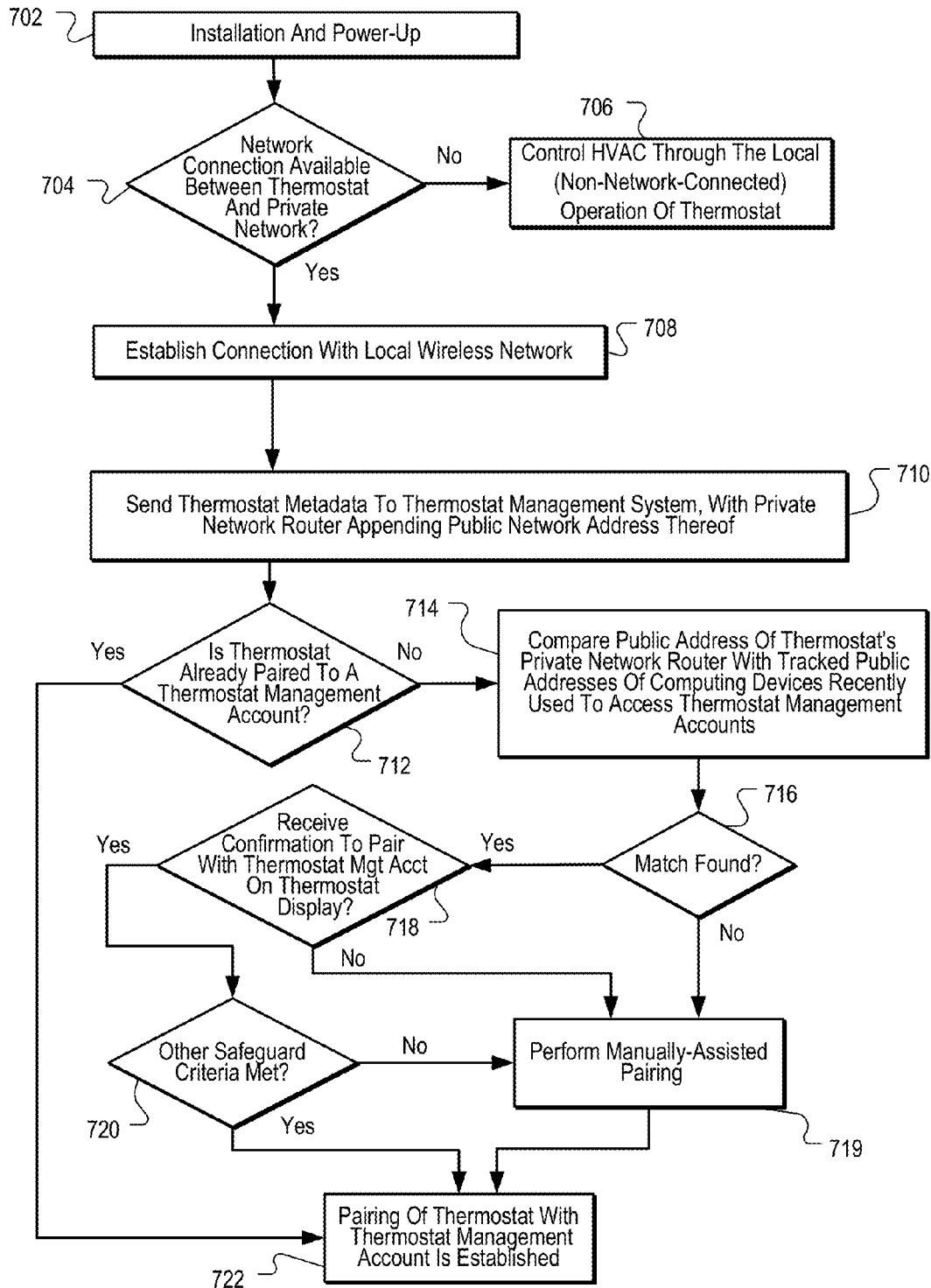
FIG. 7 is a flowchart diagram providing the operations performed on a thermostat to pair it with a thermostat management account in accordance with embodiments of the present invention.

FIG. 7 illustrates a flowchart diagram representative of operations to pair a thermostat with a thermostat management account in accordance with embodiments of the present invention. It is presumed that a user has physically installed the thermostat in an enclosure, residential or commercial, including connecting control wires and optional power from the thermostat to HVAC controller and associated HVAC system (step 702). These control wires sends signals to the HVAC controller to turn-on or turn-off one or more stages in the heating or cooling units associated with the HVAC. The thermostat may be mounted on a wall at different heights and orientations to encourage proper operation of occupancy sensors, thermal sensors, proximity sensors, or other sensors contained with the thermostat unit. Further details on a connecting and testing control wires on a thermostat is described in U.S. patent application Ser. No. 13/038,206, supra. Control over the HVAC system may be achieved through local operation of the thermostat (step 706) if there is no private network or if the private network connection is not available where the thermostat is installed (step 704—No), although such non-connected operation will generally not be as optimal and/or convenient as network-connected operation. In some implementations, the enclosure where the thermostat is located may not have a private network with wired or wireless connectivity for connecting the thermostat. Alternatively, it may be the case that a private network exists, but the thermostat is out of range and cannot connect wirelessly to the router or wireless access point in the private network. In either of these or other similar conditions, the thermostat will continue to operate in a stand-alone configuration allowing local control over the HVAC and HVAC controller even though the thermostat may not be accessible over the network. Local operation of the thermostat may include rotating outer ring 312 or pushing head unit front 402 (see FIGS. 3A-4B, supra) for control and programming thereof.

With network connectivity available (step 704—Yes), a user may first need to configure a network connection, preferably wireless, between the NIC associated with the thermostat and the private network in the enclosure (step 708). In some implementations, the thermostat may automatically suggest joining a wireless network with the strongest wireless signal as the signal strength is likely strongest from a network within the enclosure. For example, the thermostat may suggest joining the wireless network with the highest received signal strength indicator (RSSI). A user may confirm that the thermostat join the wireless network on the interface to the thermostat. In other implementations, the thermostat may display the SSIDs from nearby wireless networks on a display such as in display 306 in FIG. 4A and allow the user to twist outer ring 302 to scroll to the correct wireless network and then push on the head unit front 402 to select and attempt to join the network. If a password to the wireless network is requested, the series of characters making up the password are provided by twisting outer ring 312 to scroll through an alphabet of characters and then selecting the character by pushing the entire head front unit 402. Further description of preferred thermostat user interfaces that facilitate connection to a wireless network are provided in the commonly assigned U.S. Ser. No. 13/269,501, supra. In yet another implementation, a wireless computer or wireless device may form an ad hoc network directly with the thermostat to access a built in web server and web interface then configuring the connection between the wireless NIC and the private network using the computer device and a browser. This latter approach may be useful if the display on the thermostat cannot be easily seen or reached for configuring purposes or to run certain diagnostics.

Once connected to the private network, the thermostat transmits thermostat metadata information associated therewith, including its unique thermostat identifier, to the thermostat management system 506, this information being appended with the public network address of the private network router on its way therethrough and out to the thermostat management system 506 (step 710). Registration is carried out that makes information related to the thermostat available on the thermostat management system and is a precursor to pairing the thermostat with a thermostat management account. To complete the registration, a server associated with the thermostat management system such as registration server 602 may create a new entry in a thermostat registration pool with the aforementioned data and metadata associated with the thermostat held for later processing. Depending on the implementation, the thermostat may be able to receive software and firmware updates from the thermostat management system once it is registered with the system.

The cloud-based thermostat management system maintains a unique account identifier (such as an e-mail address) for each user account that has been created, and a unique thermostat identifier (such as a MAC address) for each thermostat unit that has been manufactured. The cloud-based thermostat management server keeps track, for each user account, of a public network address from which that user most recently accessed their user account on the cloud-based thermostat management server, such tracking being applicable for both previously established user accounts and newly established user accounts.

In some embodiments, a thermostat may have already been paired to a thermostat management account (step 712—Yes), which can be detected based on the unique thermostat identifier sent at step 710, and thus the pairing is already established (step 722). In some embodiments, the thermostat identifier, the MAC address assigned to the NIC for example, may be used to find an entry for the thermostat in the thermostat registration pool and then cross-referenced with a list of thermostat management accounts. Unless the initial pairing is deleted or removed, a thermostat paired with one account may not be available for pairing with another account. On the other hand, it is to be appreciated that a single thermostat management account can be paired with multiple different thermostats.

If the thermostat has not already been paired to a thermostat management account (step 712—No) (i.e., is a "pairing candidate thermostat"), then at step 714 the thermostat management server makes a determination whether the pairing candidate thermostat can be automatically associated with a thermostat management account, based on a comparison of (i) the public network address of the thermostat's private network router and (ii) the tracked public network addresses from which thermostat management account have recently been accessed. In the event there is such a match (step 716—Yes) between the public network address of the pairing candidate thermostat's private network router the public network address from which one user account has recently been accessed, than an automatic association is established, at least tentatively, between the unique thermostat identifier for that thermostat and the unique account identifier for that thermostat management account. Upon such positive match, however, it is preferable that at least one safeguard test (718) be made in which the thermostat management account identifier (e.g., the user's e-mail address) on the thermostat display screen (see FIG. 8B), and requesting an affirmative confirmation input from the user into the thermostat. Further safeguards are also carried out (720), and if all are satisfied then the pairing is affirmatively established (step 722).

However, if no match is found at step 716, or if any of the safeguard tests (718, 720) are not satisfied, then it is required that a manually assisted pairing process take place (step 719) in order to have the pairing affirmatively established (step 722). Optionally, if no match is found at step 716, the user may be invited to establish and/or log into their thermostat management account, whereupon the steps 714-716 are then repeated to see if a match occurs.

Figure 8A:
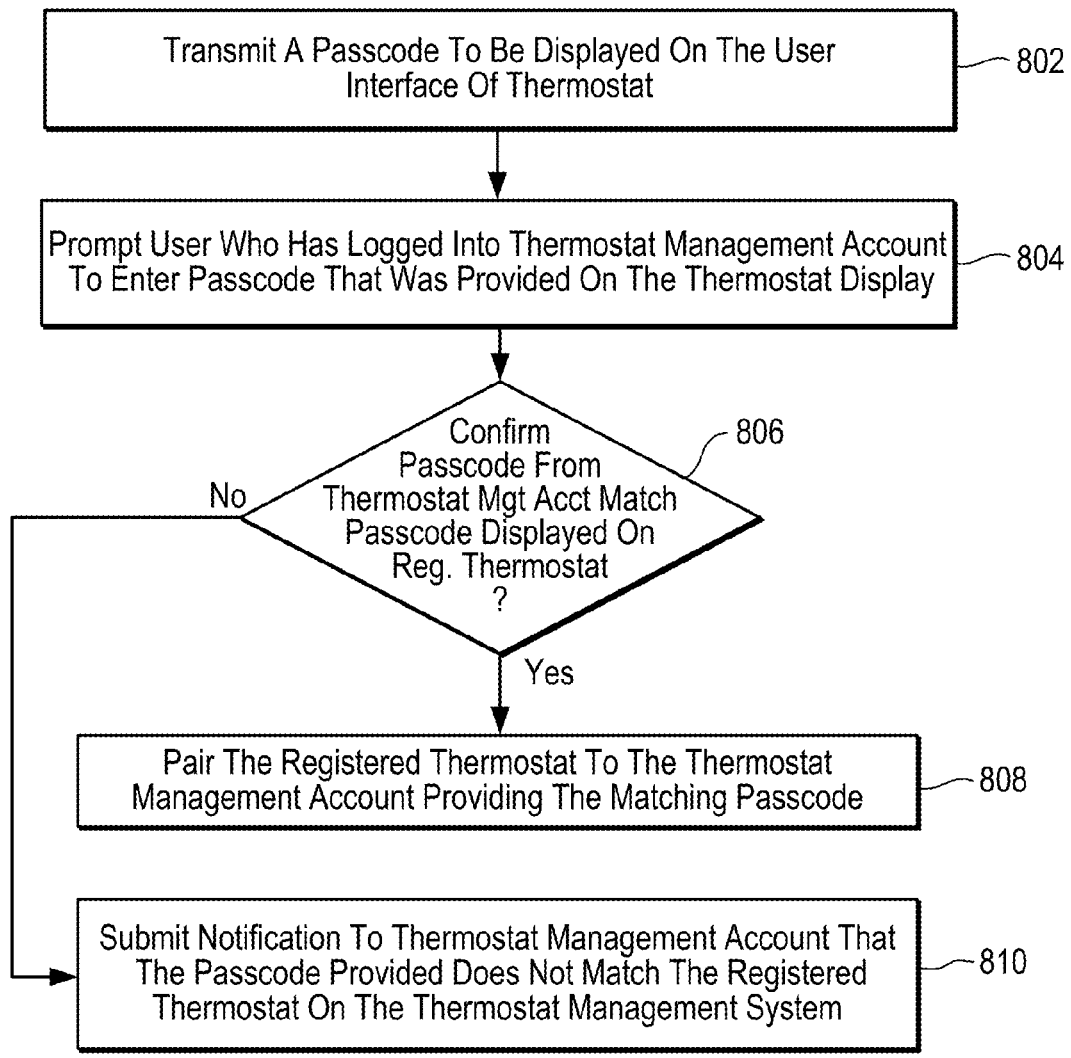
FIG. 8A is a flowchart diagram providing the operations associated with creating and using a thermostat management account on a thermostat management system in accordance with embodiments of the present invention.
Figure 8B:
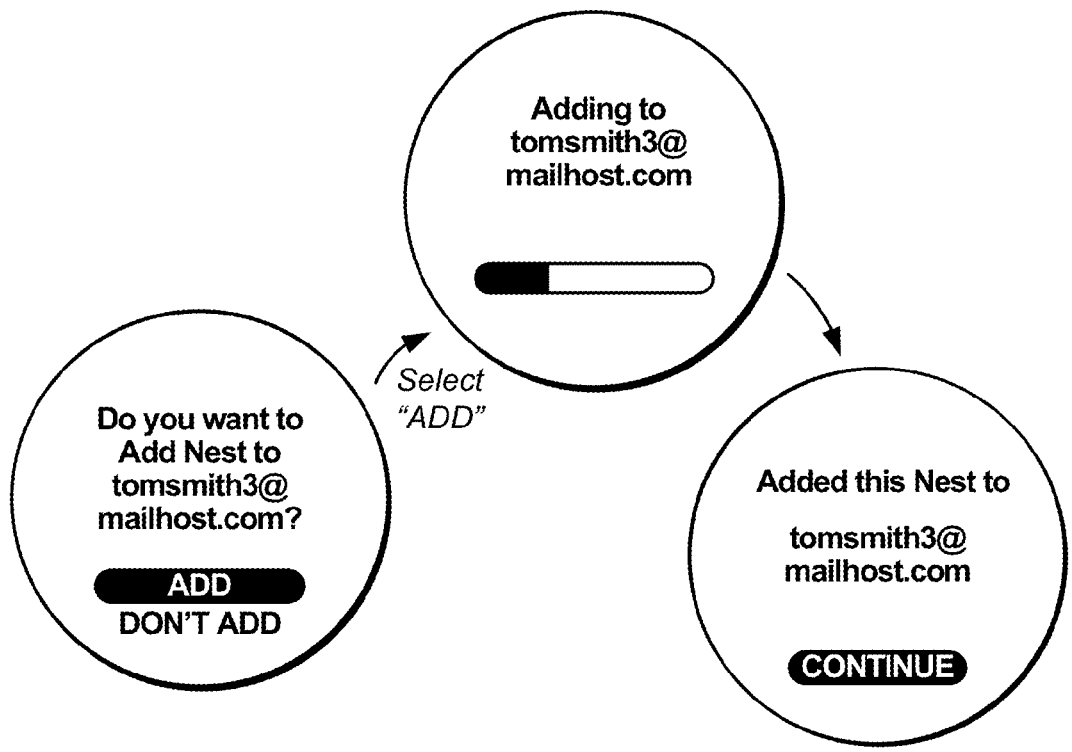
FIG. 8B illustrates thermostat user interface screens associated with user confirmation of an automatically paired association between a thermostat and a thermostat management account.
Figure 8C:
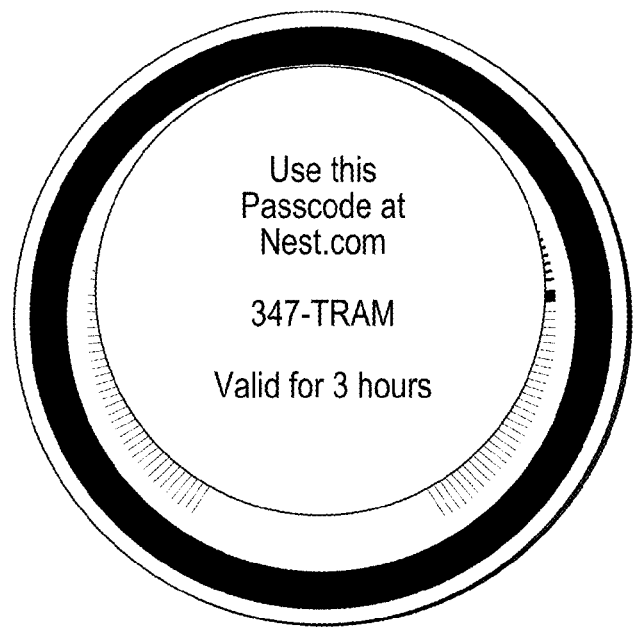
FIG. 8C illustrates a thermostat user interface screen associated with a manually assisted pairing between a thermostat and a thermostat management account.

For manually assisted pairing, the thermostat may receive from pairing server 606 a seven character alphanumeric passcode sequence to be displayed on the thermostat display, with one example being shown in FIG. 8C. A user in the vicinity of the thermostat seeing the passcode may enter the alphanumeric sequence into their thermostat management account. If the alphanumeric sequence is entered into the thermostat management correctly, the pairing server will pair the thermostat with the user's thermostat management account.

According to some embodiments, the predetermined safeguards carried out at step 720 can comprise the cancellation of any tentative pairing associations (i.e., requiring manual assistance) in any of the following cases: (i) two different user accounts have been logged into from the same public network address now being used by the thermostat's private network router within the past 24 hours (or other suitable time window), and (ii) there are two different pairing candidate thermostats simultaneously accessing the cloud-based thermostat management server from the same public network address.

FIG. 8 provides a flowchart diagram of the operations for manually assisted pairing of a thermostat and thermostat management account by way of a passcode. In one embodiment, a server, such as pairing server 606 in FIG. 6, from the thermostat management system may transmit a passcode to be displayed on the user interface of a registered thermostat. (802) In some embodiments, the passcode is generally displayed on the display portion of the thermostat as shown in FIG. 8C. Generally, a user reads the passcode from the display of the thermostat and then enters the passcode into a thermostat management account. Preferably each passcode is sufficiently different to avoid possible collisions or conflicts with other active passcodes yet easily remembered to avoid human memory or recall errors. In some embodiments, a memorable 7-digit passcode may constructed with a combination of a phone number area code familiar to the user and an easily remembered four-letter word. For example, the passcode "347-TRAM" displayed on thermostat 964 includes a memorable three-digit code, that happens to be a New York City area code, combined with an easy to remember word—tram.

The pairing server may receive a confirmation passcode from a thermostat management account requesting a pairing be made with the respective thermostat displaying the passcode. (804) If the server confirms a passcode match between the thermostat and the thermostat management account (806—Yes), the system pairs the thermostat to the thermostat management account. (808) If there is not a passcode match, some embodiments may submit a notification to the thermostat management account that the passcode provided does not match the registered thermostat in the thermostat management system. (810) For example, this might occur if the passcode has been entered into the account incorrectly. It may also occur if the passcode has been displayed on the thermostat display beyond a predetermined time interval, such as 3 hours, and has timed-out or been removed from the system.

Figure 9A:
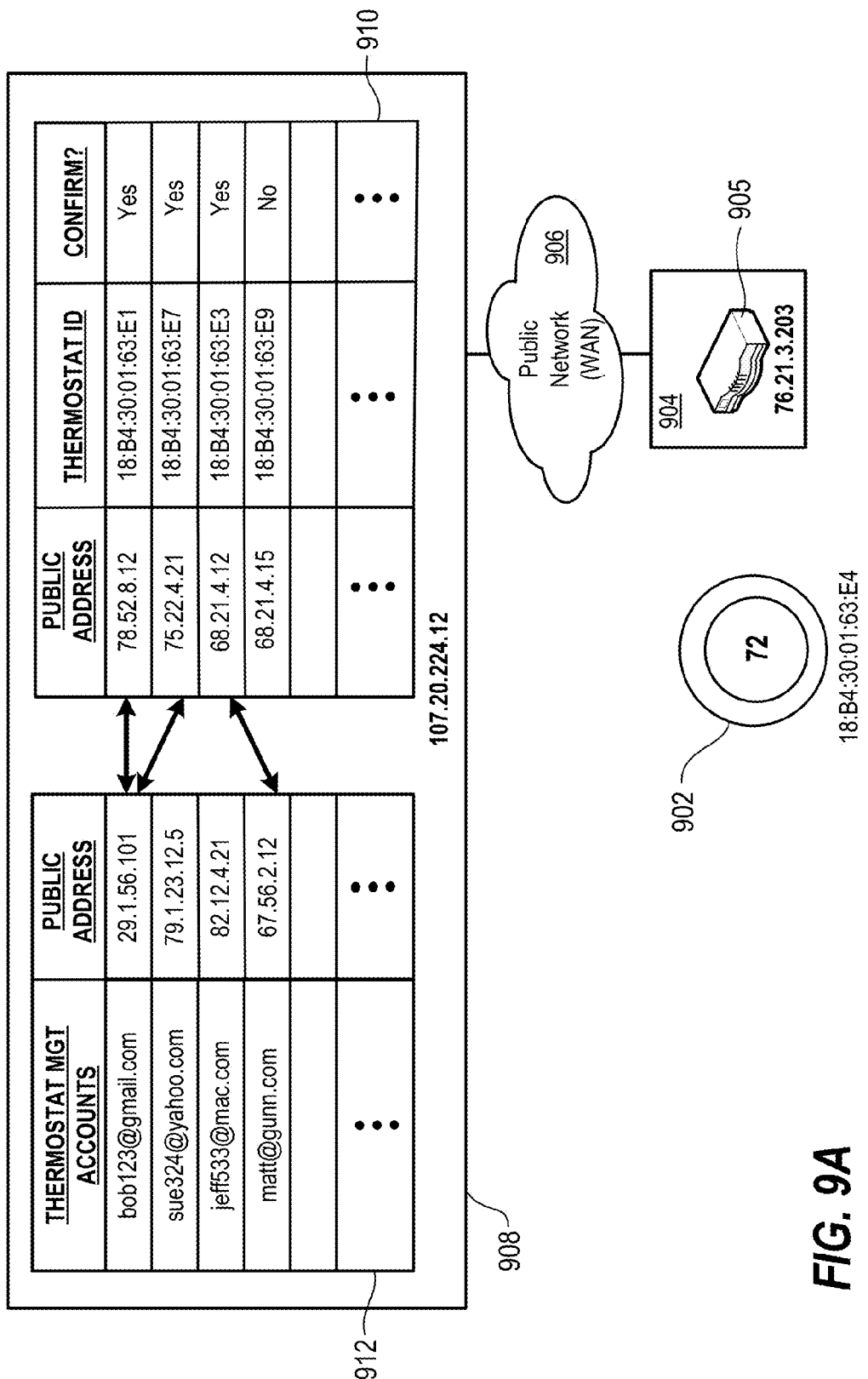
FIGS. 9A-9E present schematic illustrations and flowchart diagrams associated with the auto-pairing of thermostats with thermostat management accounts in accordance with embodiments of the present invention.

FIG. 9A-9E present schematic illustrations and flowchart diagrams associated with the auto-pairing of thermostats with thermostat management accounts in accordance with embodiments of the present invention. FIG. 9A illustrates a thermostat to be connected on a private network and data portions from a pairing server on a public network used in accordance with one embodiment. In this example, a thermostat 902 is installed in an enclosure having a private network 904 and router 905 connected to a public network 906 such as the Internet. Pairing server 908, which is component of a larger cloud-based thermostat management system, has a public network address 107.20.224.12 on public network 906 and includes a thermostat registration pool 910 and a thermostat management account table 912. As illustrated in FIG. 9A, thermostat 902 has a MAC address of 18:B4:30:01:63:E4, which may be used as a thermostat identifier, but is not yet connected to the private network 904 and/or public network 906.

As illustrated in this schematic, thermostat registration pool 910 includes a list of all currently registered thermostats in the system having thermostat identifiers 18:B4:30:01:63:E1, 18:B4:30:01:63:E7, 18:B4:30:01:63:E3, and 18:B4:30:01:63:E9, and corresponding public network addresses or public addresses 75.52.8.12, 75.22.4.21, 68.21.4.12, and 68.21.4.15. A confirm field in the thermostat registration pool 910 with a "Yes" entry indicates that thermostats 18:B4:30:01:63:E1, 18:B4:30:01:63:E7, and 18:B4:30:01:63:E3 have been affirmatively paired with accounts bob123@gmail.com and matt@gunn.com, respectively, from thermostat management accounts 912, these pairings being indicated by the arrowed lines between the tables 910 and 912 in FIG. 9A. Notably, bob123@gmail.com is paired with two thermostats 18:B4:30:01:63:E1 and 18:B4:30:01:63:E7 and matt@gunn.com is paired with one thermostat 18:B4:30:01:63:E3. In comparison, thermostat management accounts jeff533@mac.com and sue324@yahoo.com are not paired with any thermostats and the thermostat associated with thermostat identifier 18:B4:30:01:63:E1 remains unpaired with an account.

Figure 9B:
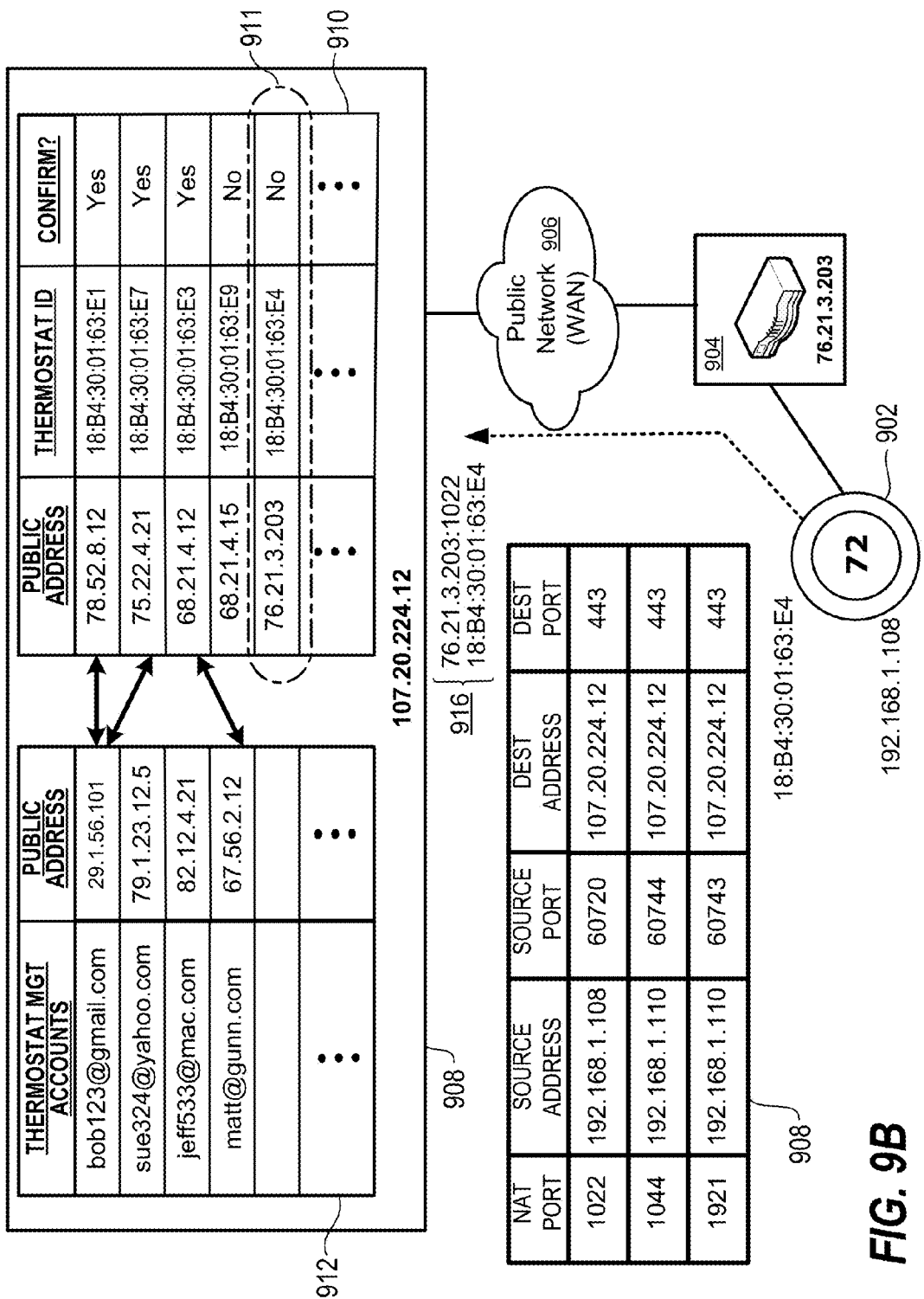

In FIG. 9B, thermostat 902 has been connected wirelessly to the private network 904 and assigned a private network address of 192.168.1.108 by the router. The router has also created an entry for thermostat 902 in a NAT table 914 identified by NAT port 1022 allowing thermostat 902 to access pairing server 908 at destination address 107.20.224.12 and destination port 443 on the public network. Packets from thermostat 902 sent to pairing server 908 have a public network address 76.21.3.203:1022 corresponding to the public network address of the router and the NAT port identifier in NAT table 914. Consequently, thermostat metadata 916 having a public network address and port of 76.21.3.203 and thermostat ID 18:B4:30:01:63:E4 is used to register thermostat 902 in the thermostat registration pool 910 with thermostat registration pool entry 911 as indicated.

Figure 9C:
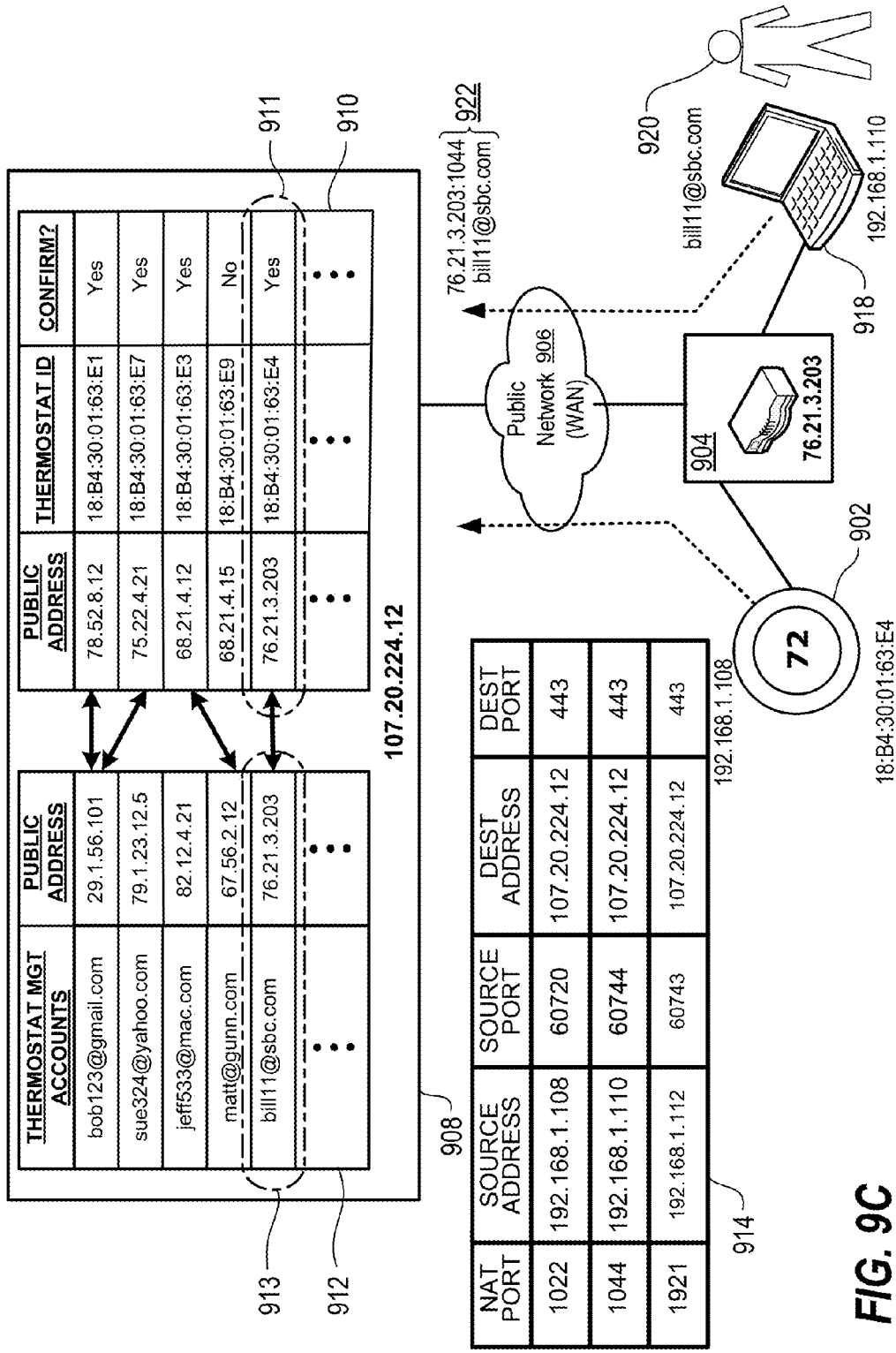

The schematic in FIG. 9C further illustrates a user 920 with account name bill11@sbc.com wirelessly connecting computer device 918 through private network 904. The router on private network 906 assigns a private network address 192.168.1.110 to computer device 918 and an entry in the NAT table 914 identified by NAT port 1044 which allows computer device 918 to also access pairing server 908 on the public network. Packets from computer device 918 sent to pairing server 908 have a public network address and port of 76.21.3.203:1044, thus corresponding to the public network address of the router and the NAT port 1044 in NAT table 914. Thermostat access client metadata 922 having a public network address of 76.21.3.203 and an account name of bill11@sbc.com is then used in the thermostat management account table 912 to provision a thermostat management account 913 entry as highlighted. In accordance with further embodiments, pairing server 908 may then initiate an automatic pairing or auto-pairing between thermostat registration pool entry 911 and thermostat management account entry 913 as they have a matching public network address of 76.21.3.203. In this particular example, auto-pairing creates an association as illustrated between thermostat registration pool entry 911 and thermostat management account entry 913.

To help ensure the thermostat is paired with the right account, some embodiments may include one or several additional confirmation operations for safeguarding purposes. In some embodiments, a thermostat frontend UI server 608 (see FIG. 6) displays dialog 924 in FIG. 9D to a user accessing their thermostat management account on a computer device running a thermostat access client. Dialog 924 notifies a user that the autopairing routine has located a thermostat for pairing is going to automatically add or pair it to the particular thermostat management account. If the user does not want to pair the thermostat to the thermostat management account, a rejection dialog 930 allows the user to request "DO NOT ADD" the thermostat and the pairing will be cancelled.

Figure 9D:
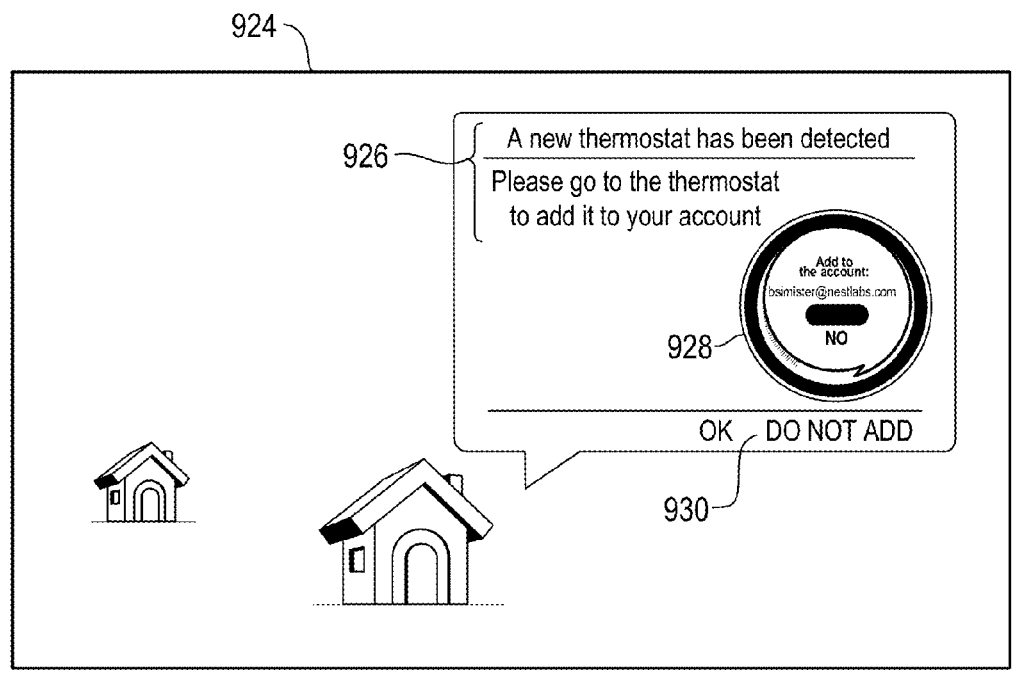
Figure 9D:
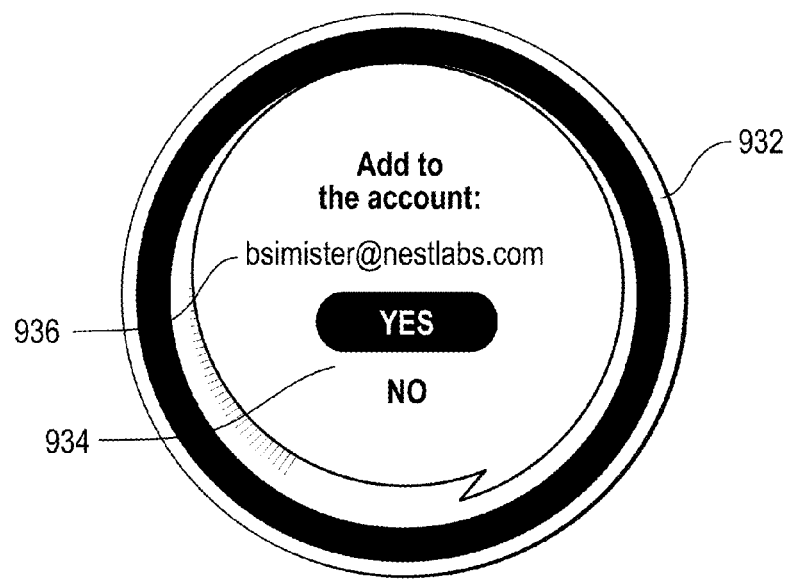

If the user does not cancel the pairing, one embodiment as illustrated in the dialog 924 in FIG. 9D further notifies the user, "A new thermostat has been detected" and then suggests to the user to, "Please go to the thermostat to add it to your account". In one embodiment, the thermostat frontend UI server 608 delivers a thermostat image facsimile 928 with a confirmation dialog to assist the user in finding the thermostat. The user may then locate thermostat 932 as illustrated in FIG. 9D with an account name 936, in this example bsmister@nestlabs.com, and confirmation dialog 934 to confirm the pairing with the account. The user may operate the outer ring of thermostat 932 and either confirm (i.e., select YES) or reject (i.e., select NO) pairing the thermostat 932 with thermostat management account 936. If the user confirms the YES/NO dialog 934, an entry in the CONFIRM? column in thermostat registration pool 910 receives a "Yes" entry and the thermostat is paired.

In some embodiments, confirmation dialog 934 helps ensure pairing server 908 does not automatically pair a thermostat to a thermostat management account until a user authorizes it. In other embodiments, the confirmation may also be used to limit accidentally autopairing a thermostat to the wrong thermostat management account if multiple users are on the same private network. For example, a retail store or coffee shop may try to pair a thermostat using a shread private network with multiple customers who are also accessing their thermostat management accounts. If this latter condition occurs, the thermostat management table such as thermostat management table in FIG. 9C will have multiple entries with the same public network address (not shown) and the autopairing server may be unable to determine which account should be paired with the thermostat. To avoid this conflict, the confirmation dialog 934 may optionally serially step through a list of possible accounts and allow a user to select which account should be paired with the thermostat. In yet another embodiment, if multiples entries of the same public network address and thermostat management table cannot be disambiguated then some embodiments of the present invention may opt out of autopairing and use another type of pairing such as passcode pairing describe herein below.

Figure 9E:
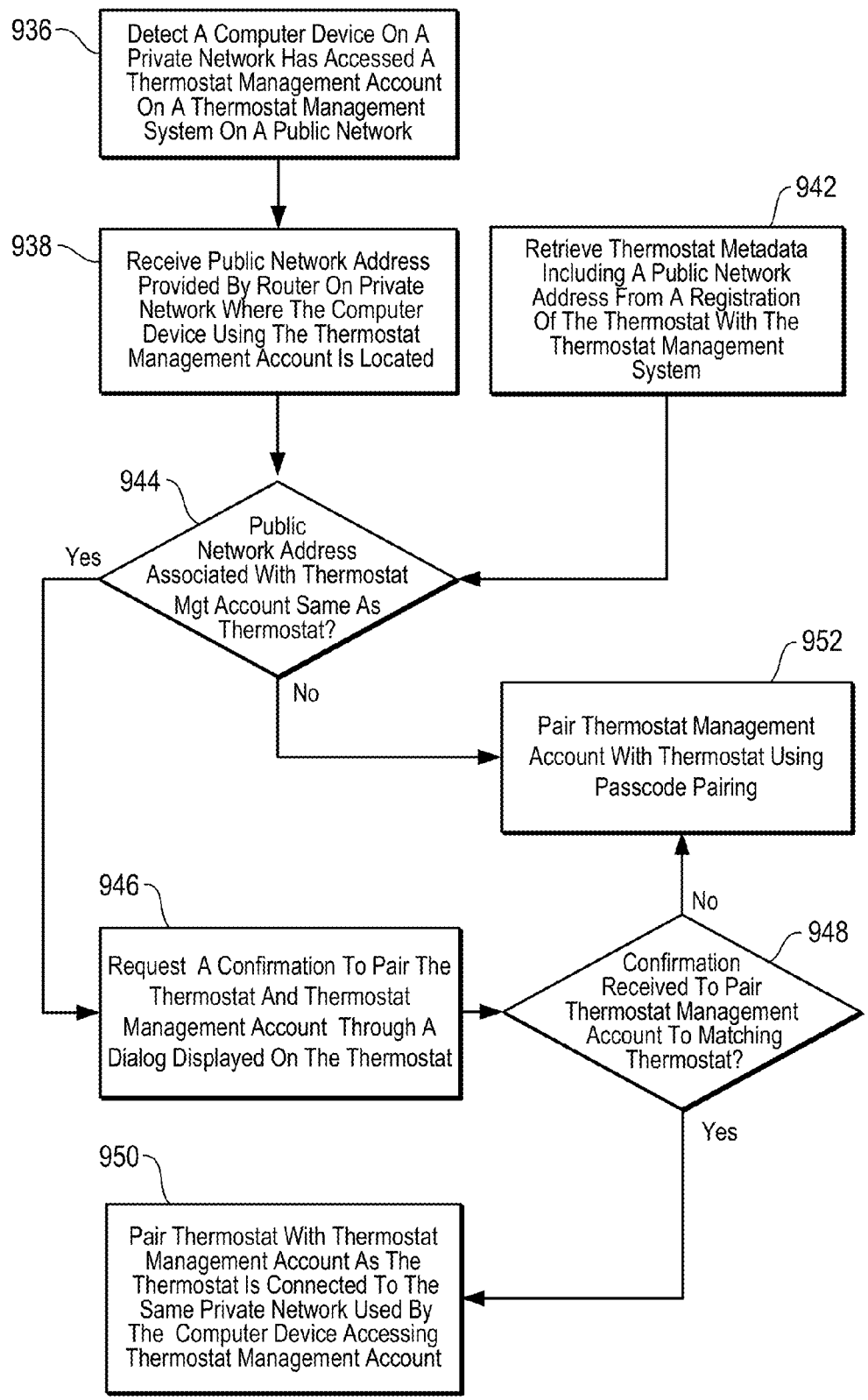

FIG. 9E provides a flowchart diagram of the operations associated with autopairing a thermostat and thermostat management account in accordance with embodiments of the present invention. In one embodiment, a pairing server, such as pairing server 606 in FIG. 6, detects a computer device on a private network has accessed a thermostat management account on a thermostat management system on a public network. (936) In some embodiments, autopairing may take place when a user has created a thermostat management account and logged into the service. For example, autopairing may take place when a user creates an account and/or accesses account information located in a thermostat management account table 912 illustrated in FIG. 9B. If the thermostat management account is currently accessed, a user is also likely to be available to confirm autopairing of one or more thermostats with the thermostat management account. In addition, accessing the thermostat management account may update a public network address and allow new thermostats to be detected and autopaired.

Embodiments of the present invention further receive a public network address associated with the thermostat management account provided by a router on a private network. (938) As previously described, devices on a private network generally share a public network address with the router providing the private network with access to the public network such as the Internet. The router device on the private network use the NAT table entries to bridge between addresses used on private and public networks. One embodiment stores the public network address associated with the computer device accessing the thermostat management account in a thermostat management account table 913 in FIG. 9C. Autopairing performed by pairing server 908 depends on devices and services on one private network sharing a single public network address to make the pairing determination.

In another embodiment, the pairing server retrieves thermostat metadata including a public network address from a registration of the thermostat with the thermostat management system. (942) In some embodiments, a thermostat attached to a private network initially requests access and registration on the thermostat management system to obtain data, updates, and eventually pairing with a thermostat management account. During the registration, the thermostat may provides thermostat metadata information to be entered in a thermostat registration pool, such as thermostat registration pool 910. This thermostat metadata information includes a public network address and thermostat identifier in one embodiment. At the time of registration, the public network address is provided by the router on the private network where the thermostat is located. In one embodiment, autopairing relies on the same public network address used by the thermostat being shared by the router with computer devices, thermostats and other services on the private network.

Embodiments of the present invention determines whether the public network address associated with the thermostat management account is the same as the public network address associated with the thermostat. (944) As previously described, the public network addresses should match if the computer device that accessed the thermostat management account is on the same private network as the thermostat. However, if the public network address for the thermostat and thermostat management account are different, (944—No) an alternate approach to pairing the thermostat management account with a thermostat may be necessary. (952)

Embodiments of the present invention presume that the thermostat management account is accessed from the same private network where the thermostat is located. As an added measure of authorization, one embodiment requests a confirmation to pair the thermostat and thermostat management account through a dialog displayed on the thermostat. (946) The confirmation may request a user setting up the thermostat to operate the interface on the thermostat and confirm a pairing with a particular thermostat management account. As an example, the thermostat 932 in FIG. 9D includes a confirmation dialog used to confirm adding a thermostat to an account. If the confirmation is not provided (948—No) then an alternate approach to pairing the thermostat management account and thermostat may be taken. (952) If the thermostat management system receives a confirmation back from the thermostat to proceed (948—Yes), embodiments of the invention will pair the thermostat to the thermostat management account. Pairing provides the thermostat access to data and also grants access to the thermostat through the thermostat management account as previously described. (950)

Figure 10A:
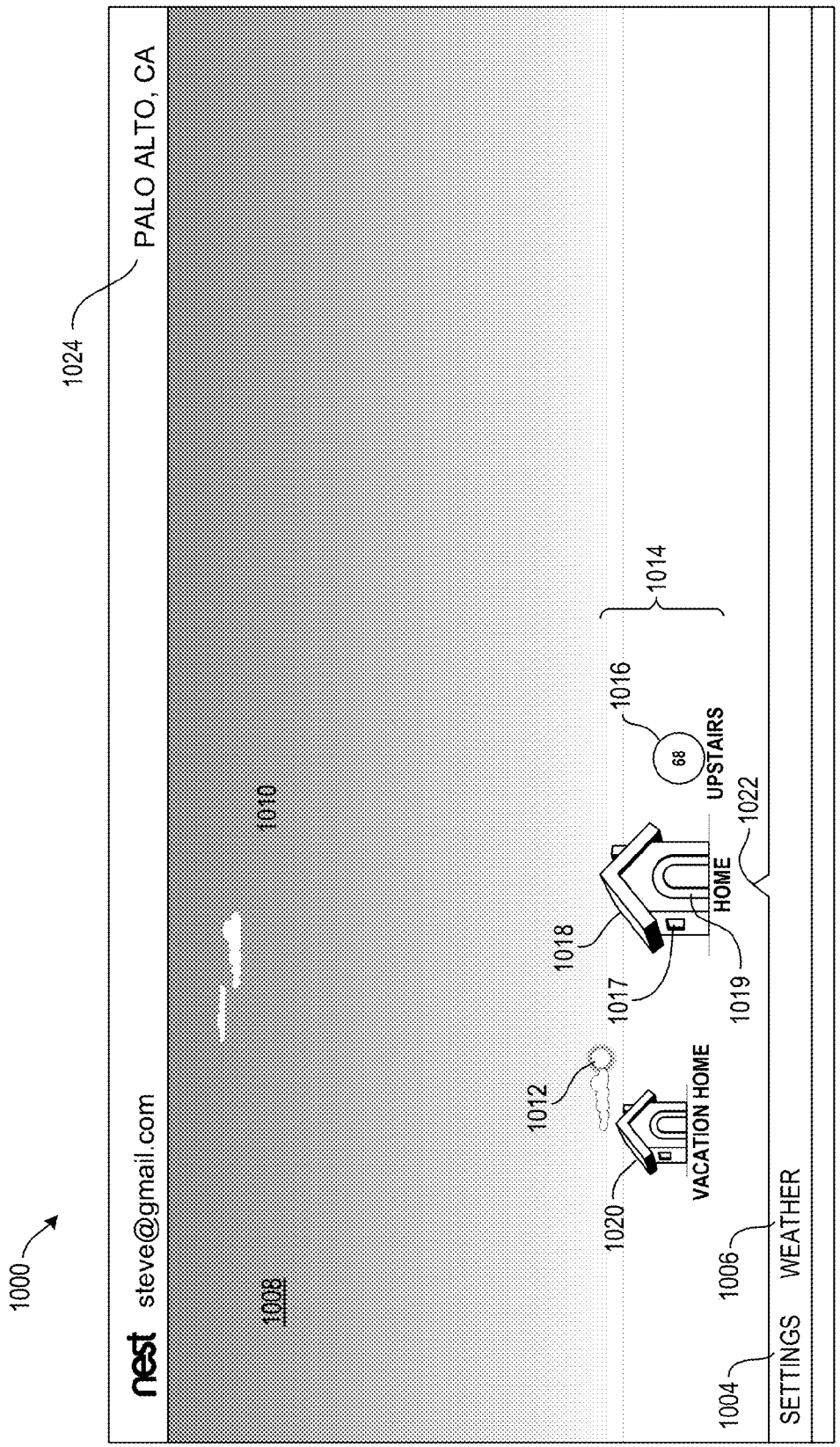
FIG. 10A-10C presents portions of the user interface from a thermostat access client designed in accordance with embodiments of the present invention.
Figure 10B:
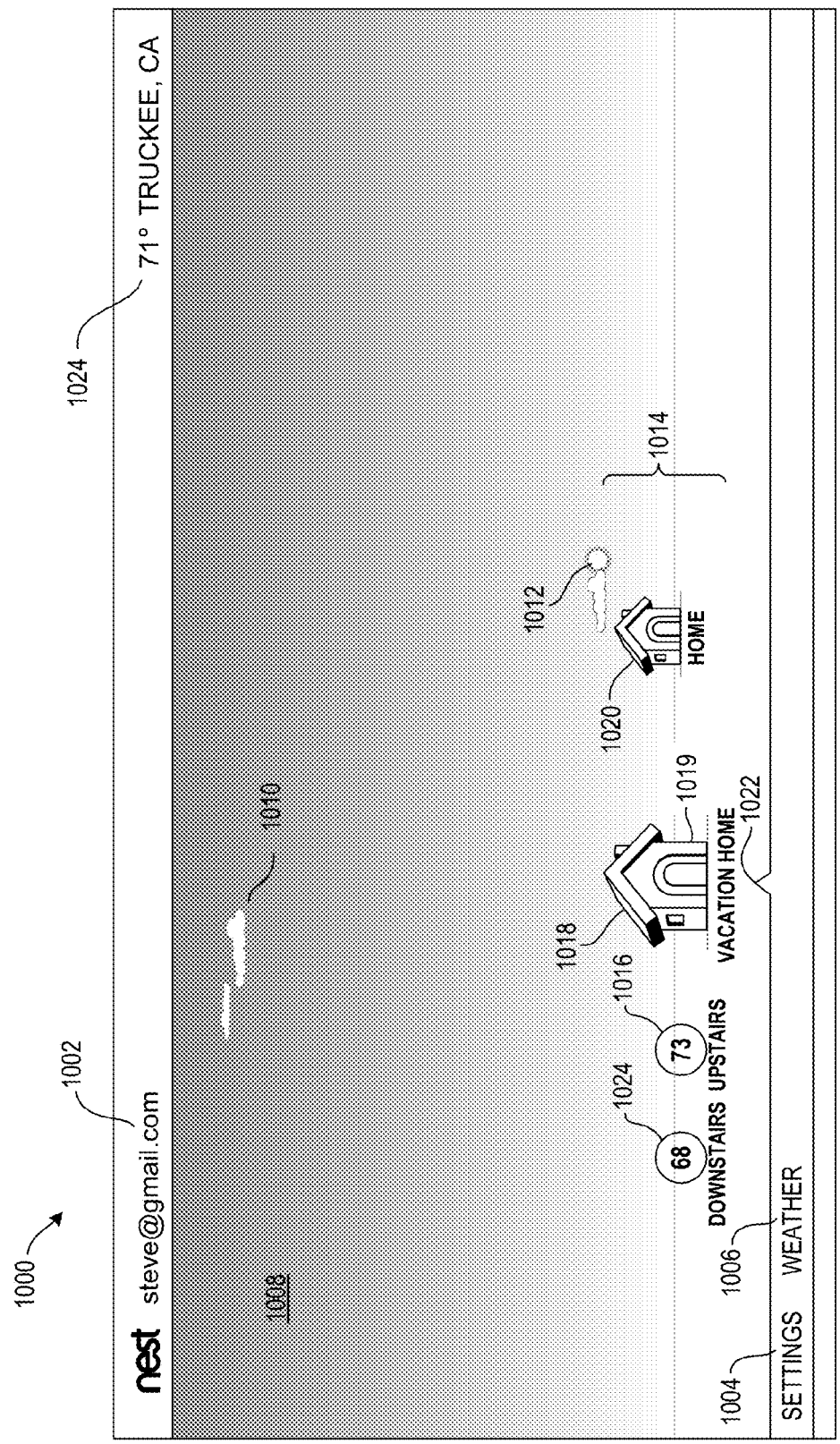
Figure 10C:
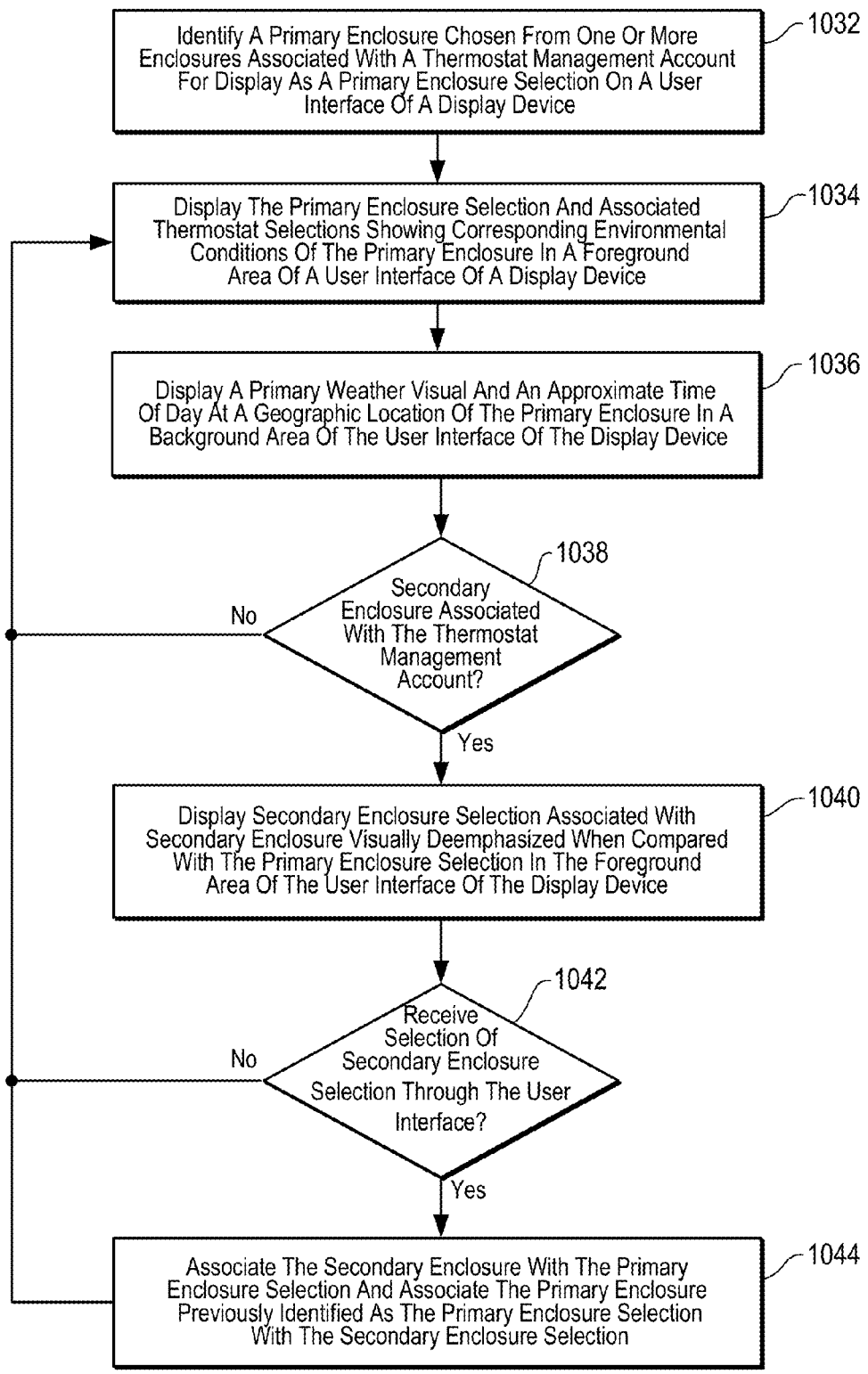
Figure 12A:
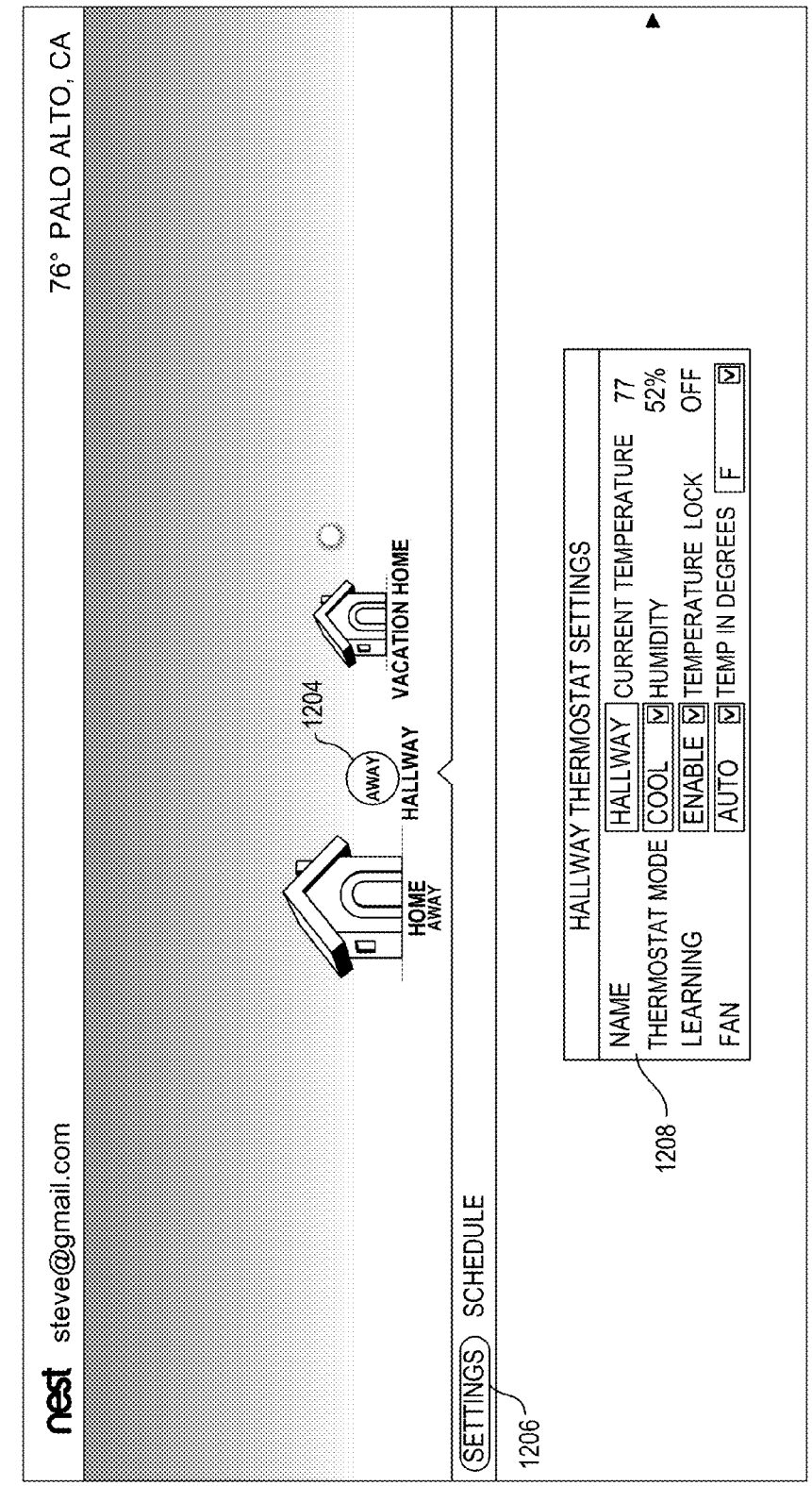
FIGS. 12A-12D illustrate a schematic of a user interface and a flowchart diagram for setting options and schedules associated with a thermostat in accordance with embodiments of the present invention.

FIG. 10A-10C presents portions of the user interface from a thermostat access client designed in accordance with embodiments of the present invention. Thermostat access client 1000 in FIG. 12A provides another aspect to thermostat access client 516 previously described and illustrated in FIG. 5. In this user interface portion, thermostat access client 1000 presents a number of computer selectable and interactive elements including an account name 1002, house settings selection 1004, weather selection 1006, background area 1008, primary visual weather 1010, secondary visual weather 1012, foreground area 1014, thermostat selection 1016, primary enclosure selection 1018, away indicator 1019, secondary enclosure selection 1020, focus indicator 1022 and location 1024. In the context of this description, the term "selection" such as used to describe house settings selection 1004, weather selection 1006, thermostat selection 1016, primary enclosure selection 1018 and others indicates that element on the user interface may be selected causing the interface to change or produce data, or both. In one embodiment, other elements not described as "selections" may provide information through the display of text, such as location 1024 showing a current location of an enclosure. Other embodiments may further provide elements that both display information through the display of text or other data and may also be selected thus serving as yet another element on the user interface which may be selected. In these other embodiments, the selection of the text may further provide related information, access to configuration portions of the user interface, or other information deemed suitable for the user interface of the thermostat access client. For example, an alternate embodiment may allow selection of location 1024 in thermostat access client 100 to display current events occurring at or near the location 1024. Accordingly, it is contemplated that one embodiment includes a combination of selections as described hereinabove and hereinbelow yet alternate embodiments may allow greater or fewer elements to be selections on the user interface providing additional information when selected.

In combining these elements together, embodiments of the present invention provide an inviting and intuitive interface for accessing, programming and controlling one or more thermostats associated with and installed in one or several enclosures. Additionally, the elements of the user interface further provide access to related information of weather, data, local community information, energy saving information, emergency response information, and other data as it relates to each of one or more enclosures associated with a user's thermostat management account. In some embodiments, account name 1002 provides the name of the thermostat management account currently using the thermostat access client as illustrated in FIG. 10A. For example, the account name may be an email address however it may also be any identifier the system may recognize and associate with the thermostat management account currently in use. Upon providing an account name 1002 and proper associated authorization, one embodiment of the user interface identifies a primary enclosure from account name 1002 as a default primary enclosure to be initially used in the user interface. In some embodiments, the default primary enclosure may be specified during a configuration of account name 1002 or it may be the enclosure used when the thermostat management account with account name 1002 was last accessed. In this example, the default primary enclosure taken from account name 1002 may be a residential home identified as "Home" and associated with primary enclosure selection 1018 while a secondary enclosure may be a vacation home identified as "Vacation Home" and associated with secondary enclosure selection 1020. As displayed in the user interface, primary enclosure selection 1018 labeled "Home" is emphasized in the foreground area 1014 and appears to be larger in size and in front of the smaller secondary enclosure selection 1020 labeled "Vacation Home". Focus indicator 1022 operates to further help identify and direct a user's attention to one main element in the user interface currently being accessed and/or operated upon in the user interface. In this example, focus indicator 1022 identifies primary enclosure selection 1018 as the main element and one source of information driving other portions of the user interface. While not shown in FIG. 10A, focus indicator 1022 may identify other elements such as thermostat selection 1016 as the main element in the user interface rather than primary enclosure selection 1018.

Since primary enclosure selection 1018 is identified by focus indicator 1022, background area 1008 of the user interface displays a primary visual weather 1010 representing a current weather in the vicinity of the primary enclosure associated with primary enclosure selection 1018. Some embodiments of primary visual weather 1010 may animate various weather image elements representing clouds, rain, snow and other weather conditions to further emphasize the weather pattern at the primary enclosure. Time of day may also be reflected by the lightness or darkness of images in primary visual weather 1010 depending on the time zone associated with the location of the primary enclosure, which in this case appears to be daytime as reflected in primary visual weather 1010 in FIG. 10A. Other elements on the user interface associated with primary enclosure selection 1018 include a temperature/location 1024 indicating a current temperature and temperature at the primary enclosure location and weather selection 1006 that, when selected, provides a forecast of weather also related to the primary enclosure. House settings selection 1004 displays information, when selected, related to the address, zip code and location of the primary enclosure associated with primary enclosure selection 1018.

An away indicator 1019 appears as different colors in a window 1017 of the house image of primary enclosure selection 1018 and in the width of the outline of the inverted "U" shaped door-like image along the front of the house image. For example, a color in the window and door appearing as a golden yellow color may indicate that someone is presently occupying the house or office but if the color turns dark or black then it shows that the house or office is unoccupied.

In some embodiments, the primary enclosure selection 1018 also displays a thermostat selection 1016 for each of the thermostats used within the actual primary enclosure. It appears that the primary enclosure selection 1018 with the label "HOME" in this example represents a primary residence or home having only one thermostat as represented by thermostat selection 1016 displayed in the foreground area 1014. Upon selecting thermostat selection 1016 in some embodiments, focus indicator 1022 slides under thermostat selection 1016 and the user interface presents another portion of the interface for setting up heating and cooling setpoints according to a schedule.

FIG. 10B presents a similar portion of the user interface from the thermostat access client as FIG. 10A with a different enclosure selected as the primary enclosure in accordance with another embodiment. In FIG. 10B, the primary enclosure selection 1018 indicates the enclosure labeled "VACATION HOME" as the primary enclosure and the enclosure labeled "HOME" as the secondary enclosure selection 1020. The selection of secondary enclosure selection 1020 in FIG. 10A causes the associated secondary enclosure to assume the role of the primary enclosure and become associated with the primary enclosure selection 1018 as illustrated in FIG. 10B. Likewise, the primary enclosure associated with the primary enclosure selection 1018 in FIG. 10A assumes the role of the secondary enclosure and corresponding secondary enclosure selection 1020 in FIG. 10B. This primary enclosure selection 1018 in the user interface in FIG. 10B further displays two thermostats installed in the "VACATION HOME" enclosure with a thermostat selection 1016 labeled "UPSTAIRS" and another thermostat selection 1024 labeled "DOWNSTAIRS". Similarly, the primary visual weather 1010 reflects the current weather and time of day in the vicinity of the primary enclosure selection 1018 in FIG. 10B.

FIG. 10C provides a flowchart of the operations associated with the thermostat access client interface in accordance with one embodiment of the present invention. Operations in FIG. 10C provide another aspect to embodiments of the user interface depicted in FIG. 10A and FIG. 10B. In one embodiment, the user interface identifies a primary enclosure chosen from one or more enclosures associated with a thermostat management account. The primary enclosure is associated with a primary enclosure selection for display on the user interface of a display device. (1032) For example, the user interface depicted in FIG. 10A defaults to displaying the primary enclosure selection of an enclosure labeled "HOME" selected from multiple different enclosures in the thermostat management account identified with the email address, steve@gmail.com. This default primary enclosure may be configured by a user or may be the enclosure most recently accessed and selected through the user interface. In addition, the user interface in FIG. 10A also moves the focus identifier 1022 underneath the newly selected primary enclosure selection 1018 in order to draw attention to the selection.

Once a primary enclosure is selected, the user interface of the thermostat access client displays the primary enclosure selection and associated thermostat selections (1034). In some embodiments, the individual thermostat selection may show a corresponding temperature inside or near the primary enclosure. Both the primary enclosure selection and corresponding thermostat selections appear in a foreground area of the user interface as it is displayed on a display device. For example, the primary enclosure selection may appear as an image of a house as illustrated by primary enclosure selection 1018 appearing in foreground area 1014 in FIG. 10A and FIG. 10B. Similarly, thermostat selections on the user interface may appear as the round thermostats installed in the enclosures and illustrated, for example, as thermostat selection 1016 in FIG. 10A and thermostat selections 1016 and 1024 in FIG. 10B. In some embodiments, thermostat selection 1016 represents a first thermostat associated with the current primary enclosure and the thermostat selection 1024 represents a second thermostat associated with the primary enclosure.

The user interface of the thermostat access client further displays a primary visual weather and an approximate time of day at a geographic location of the primary enclosure. (1036) In one embodiment, this primary visual weather may be displayed like primary visual weather 1010 in FIG. 10A. For example, the primary visual weather may include images and/or animated images of weather conditions such as rain, snow, hail and others in the background area of the user interface in the thermostat access client. These images generally reflect the current weather condition in the geographic region of the primary enclosure and an approximate time of day.

If just one enclosure is paired to the thermostat management account, (1038—No), the user interface continues to display the just primary enclosure selection as previously described. (1034) In alternate embodiments, a secondary enclosure paired to the thermostat management account (1038—Yes) is displayed as a secondary enclosure selection in accordance with further embodiments of the user interface. The secondary enclosure selection is visually deemphasized and appears smaller when compared with the primary enclosure selection. To further deemphasize, the secondary enclosure selection may also be placed in the foreground area but appear behind the primary enclosure selection. Like the primary enclosure selection, secondary enclosure selection may look like a house such as depicted by secondary enclosure selection 1020 appearing in foreground area 1014 in FIG. 10A.

When no selections are made, (1042—No) embodiments of the user interface continues to display the same primary enclosure selection as previously described (1034). In alternate embodiments, the user interface may receive a selection of the secondary enclosure selection thereby causing a change in the primary and secondary enclosures represented by the user interface. (1042—Yes) For example, a user's selection of the secondary enclosure selection causes the secondary enclosure to assume the role of the primary enclosure and then become displayed as the primary enclosure selection on the user interface. In turn, the previous primary enclosure assumes the role of the secondary enclosure and is displayed as the second enclosure selection, visually deemphasized on the user interface. (1044) To illustrate an example of this user interface interaction, FIG. 10A displays the primary enclosure selection 1018 identified as "HOME" before receiving a user's selection. The secondary enclosure selection 1020 in FIG. 10A identified as "VACATION HOME" receives a user's selection and becomes the primary enclosure selection 1018 as illustrated in FIG. 10B. As a result, the previous primary enclosure selection identified as "HOME" becomes the secondary enclosure selection 1020 in FIG. 10B.

Figure 11A:
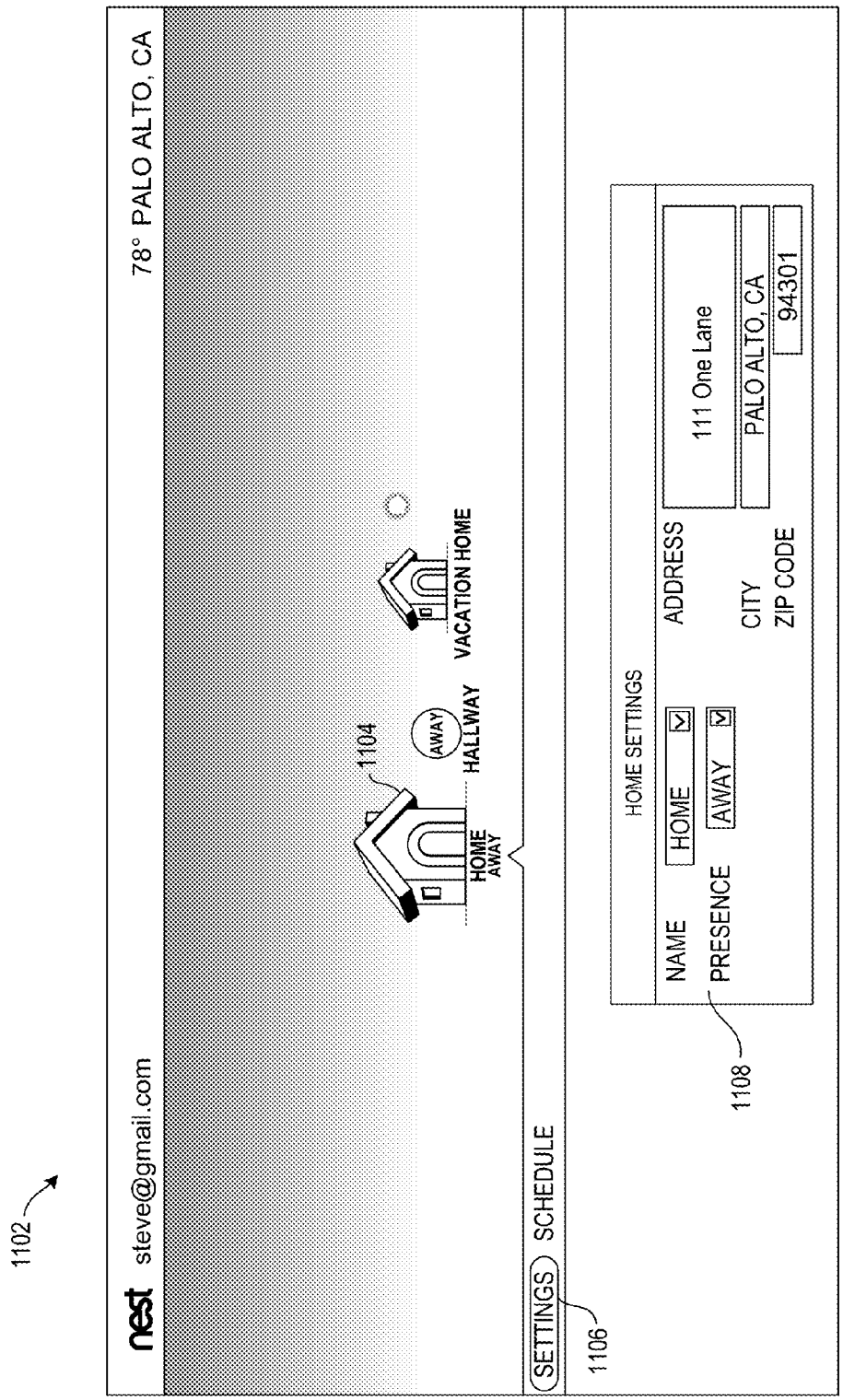
FIG. 11A-11C illustrate setting options and obtaining weather forecasts in the user interface for an enclosure in accordance with embodiments of the present invention.
Figure 11B:
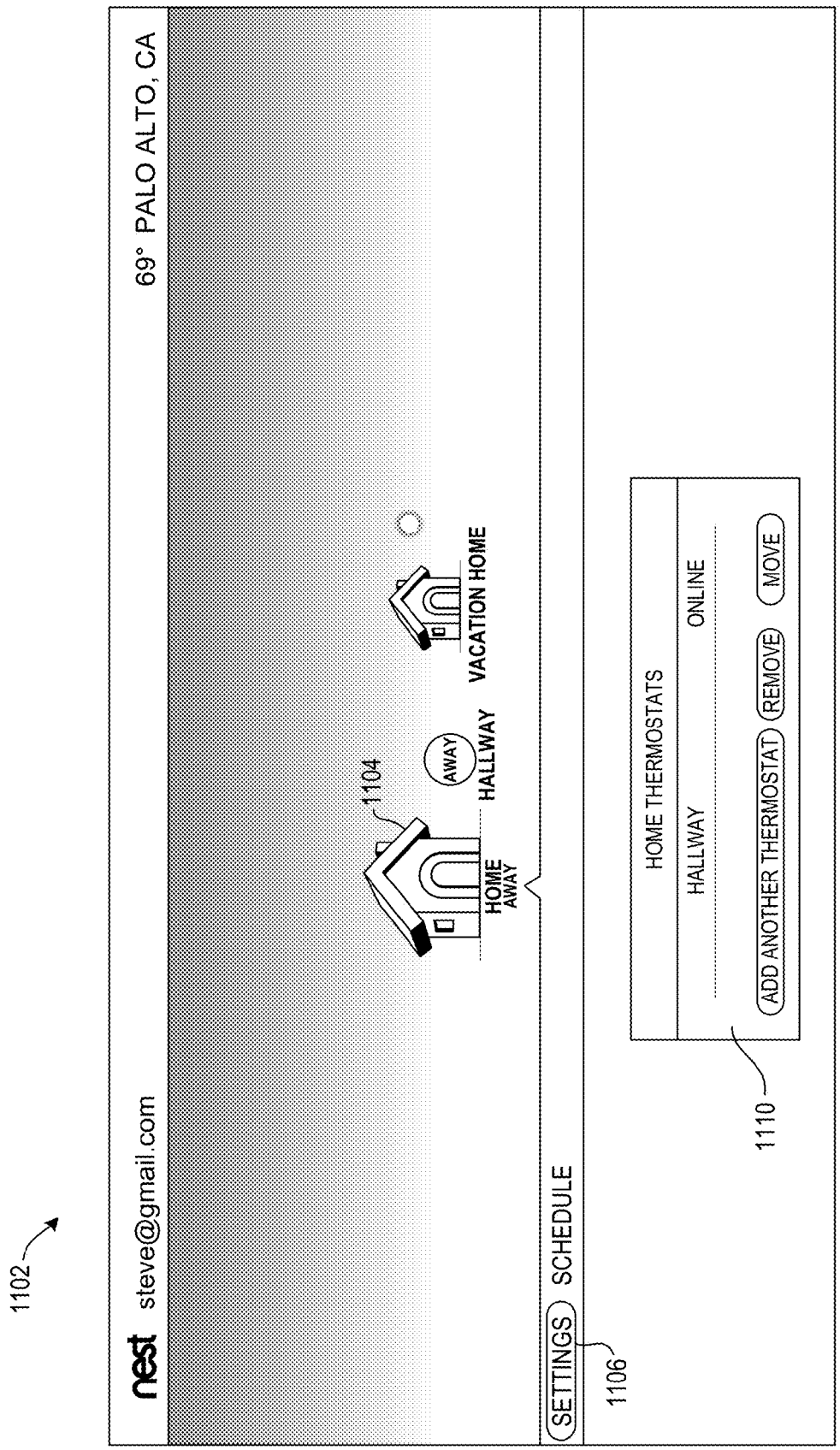
Figure 11C:
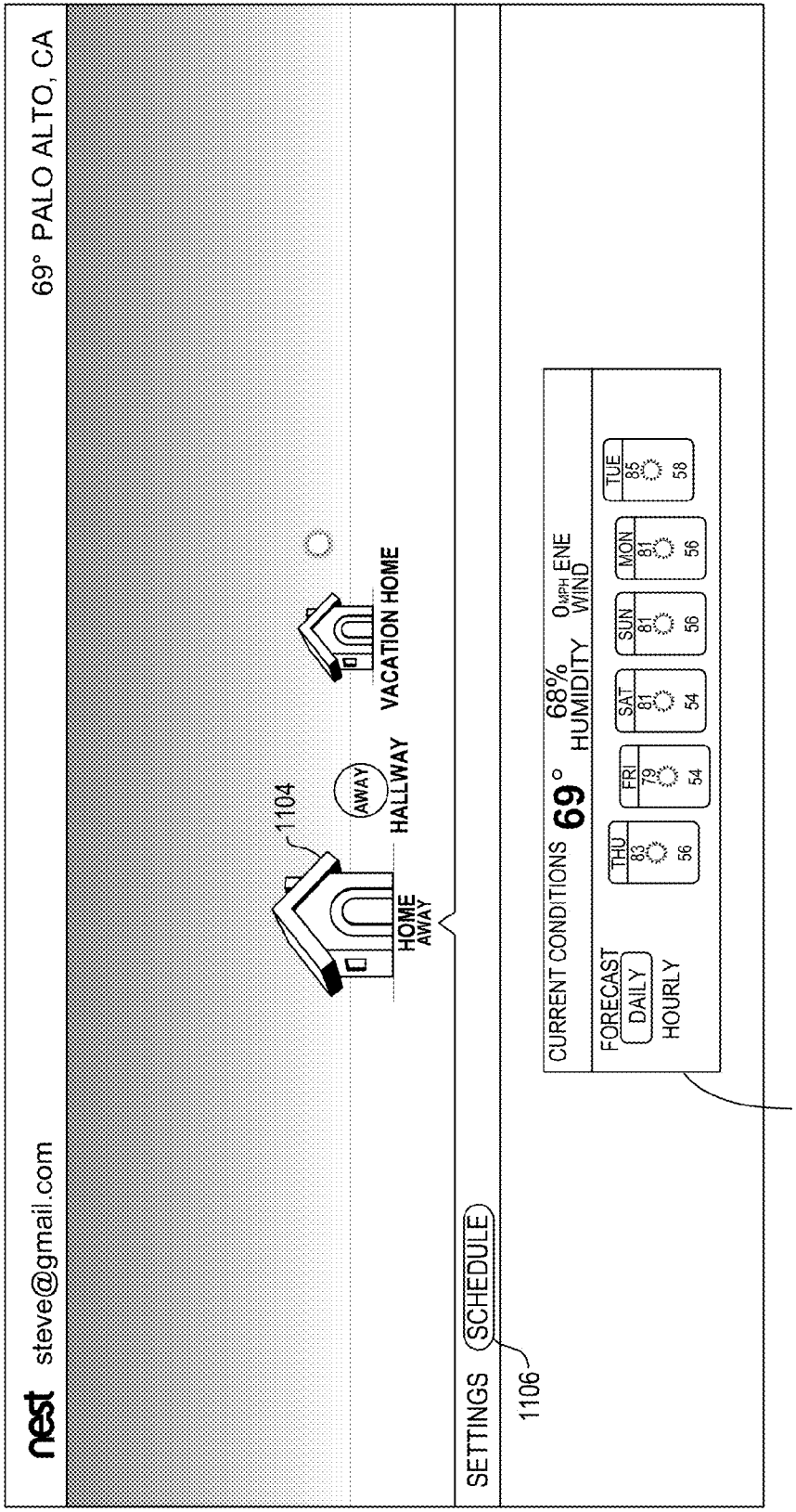

In accordance with the present invention, FIG. 11A through 11C illustrate setting options and obtaining weather forecasts in the user interface for an enclosure. In one embodiment, the options for an enclosure are displayed by selecting the primary enclosure selection 1104 and associated settings 1106 on the user interface 1102 of the thermostat access client. In this embodiment, options 1108 may include providing an address for the primary enclosure selection 1104 and indicating if the home is occupied or unoccupied. In some embodiments, setting the "presence" field in options 1108 to "AWAY" indicates the house is unoccupied and makes it appear the lights are off or dark in the house image used as primary enclosure selection 1104. Setting the "presence" field to away may also cause the thermostat to turn off the HVAC system or put the HVAC in an away state with temperature staying in a predetermined range designated for the away state of the thermostat. In other embodiments, setting the "presence" field in options 1108 to "occupied" (not shown in FIG. 11A) makes it appear that the lights are on in the house image used as the primary enclosure selection 1104 and also may turn on the HVAC system and begin a predetermined heating or cooling program.

In accordance with other embodiments, thermostat dialog 1110 available under settings 1106 in FIG. 11B provides status on thermostats and allows them to be readily added and removed. For example, thermostat dialog 1110 indicates one thermostat identified as "HALL" is paired with the thermostat account and is "ONLINE". In some embodiments, selecting the "add another thermostat" selection in thermostat dialog 1110 may urge the thermostat management system to pair with additional thermostats using the automatic pairing functions as previously described. Alternatively, selecting the "add another thermostat" may allow a user to pair an additional thermostat by entering a passcode from the thermostat into the system. FIG. 11C illustrates another embodiment of the user interface 1102 with weather forecast 1112 available under settings 1106. In this example, the weather forecast 1112 is provided as weekly forecast for the geographic area that the primary enclosure selection 1104 is located, in this case Palo Alto.

Figure 12B:
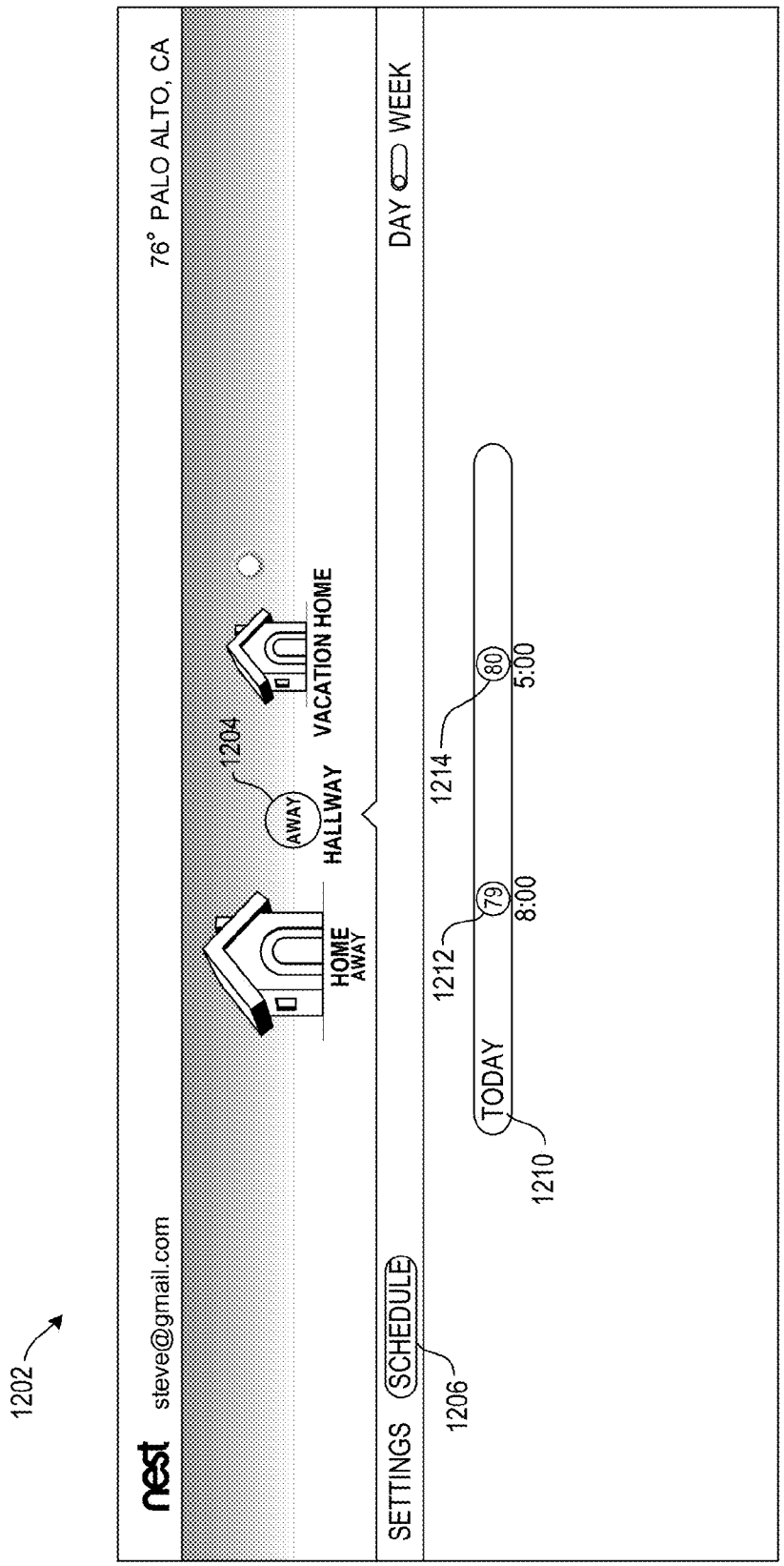
Figure 12C:
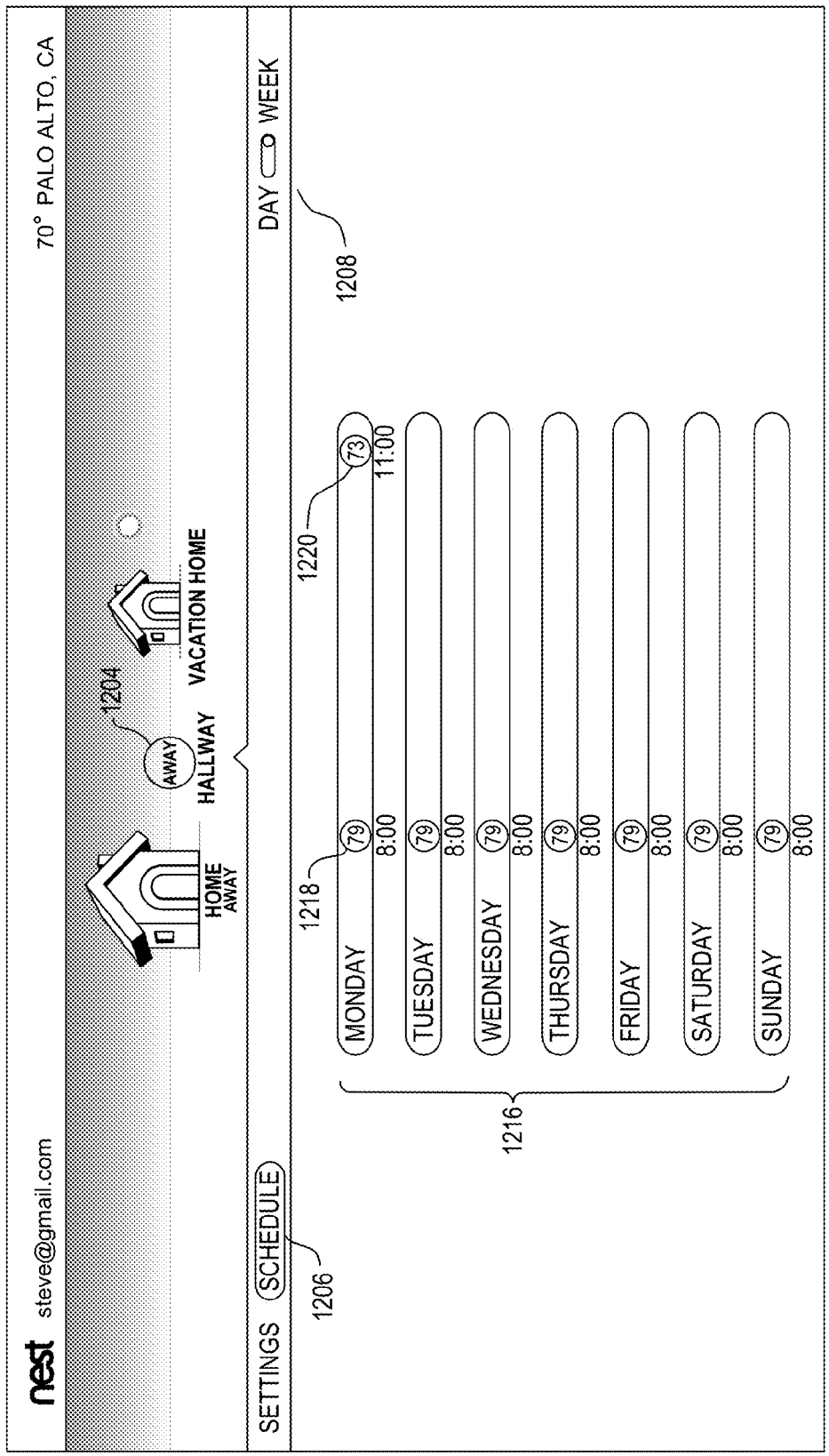

FIGS. 12A-12C illustrate a user interface in accordance with the present invention for setting options and schedules associated with a thermostat. Selecting thermostat selection 1204 and settings 1206 in user interface 1202 provides a user access to thermostat settings 1208. In one embodiment, a portion of thermostat settings 1208 include selecting a thermostat mode, a learning mode and fan mode for thermostat 1204 and corresponding HVAC system (not shown). For example, the thermostat mode may be set to "cool" to allow the HVAC to run an air conditioner or other cooling mechanism; "heat" to allow the HVAC to run a heater or other heater mechanism; or "auto" to run in either heat or cool mode depending on the programming. Learning mode enabled allows the thermostat to learn when to heat or cool based on preferences as well as historical, environmental and other data. In one embodiment, sensor data taken from sensors in the thermostat is also presented in thermostat settings 1208 and includes temperature and humidity.

FIG. 12B illustrates a user interface designed in accordance with the present invention for a single day of scheduling the thermostat. In one embodiment, the schedule for a single day is made using a selectable horizontal bar 1210 with rounded ends representing a 24 hour time-line. Selecting an open area on the selectable horizontal bar 1210 cause setpoints to be added at the indicated time interval and temperature on the selectable horizontal bar 1210. In some embodiments, adding a blue-colored setpoint (i.e., a cooling setpoint) causes the HVAC to cool if the associated setpoint temperature is exceeded while adding a red-colored setpoint (i.e., a heating setpoint) causes the HVAC to heat if the temperature drops below the associated setpoint temperature. It is contemplated that many other types of setpoints may be created with different color combinations, shapes and appearances and these setpoints may be configured to allow ranges of temperatures and auto-switching between heating and cooling. In some embodiments, removing a setpoint is achieved by selecting the previously created setpoint placed on the selectable horizontal bar 1210.

Example setpoints 1212 and 1214 added to the selectable horizontal bar 1210 can be readily understood thereby simplifying the overall scheduling of the thermostat. For example, a cooling setpoint 1212 of "79" degrees placed at the "8:00" location on the selectable horizontal bar 1210 should cause the HVAC to turn on the air conditioner and "cool" if the temperature exceeds the "79" degree temperature after "8:00". The subsequent cooling setpoint 1214 of "80" degrees at "9:00" should cause the HVAC to turn on the air conditioner and "cool" only if the temperature then exceeds "80" degrees after "9:00".

In accordance with another embodiment, FIG. 12C illustrates a user interface for scheduling a thermostat for a week. Thermostat selection 1204 and schedule selection 1206 on user interface 1202 provides a user access to the weekly schedule 1216. The weekly schedule for the thermostat works similar to the daily schedule illustrated in FIG. 12B except there are 7 different selectable horizontal bars in the interface—one horizontal bar for each day of the week Monday through Sunday. In the example illustrated in FIG. 12C, weekly schedule 1216 has cooling setpoints 1218 at 79 degrees set everyday at "8" clock. A single heating setpoint 1220 at 73 degrees is set at "11:00" on Mondays thus making sure the temperature does not get cooler than 73 degrees.

Figure 12D:
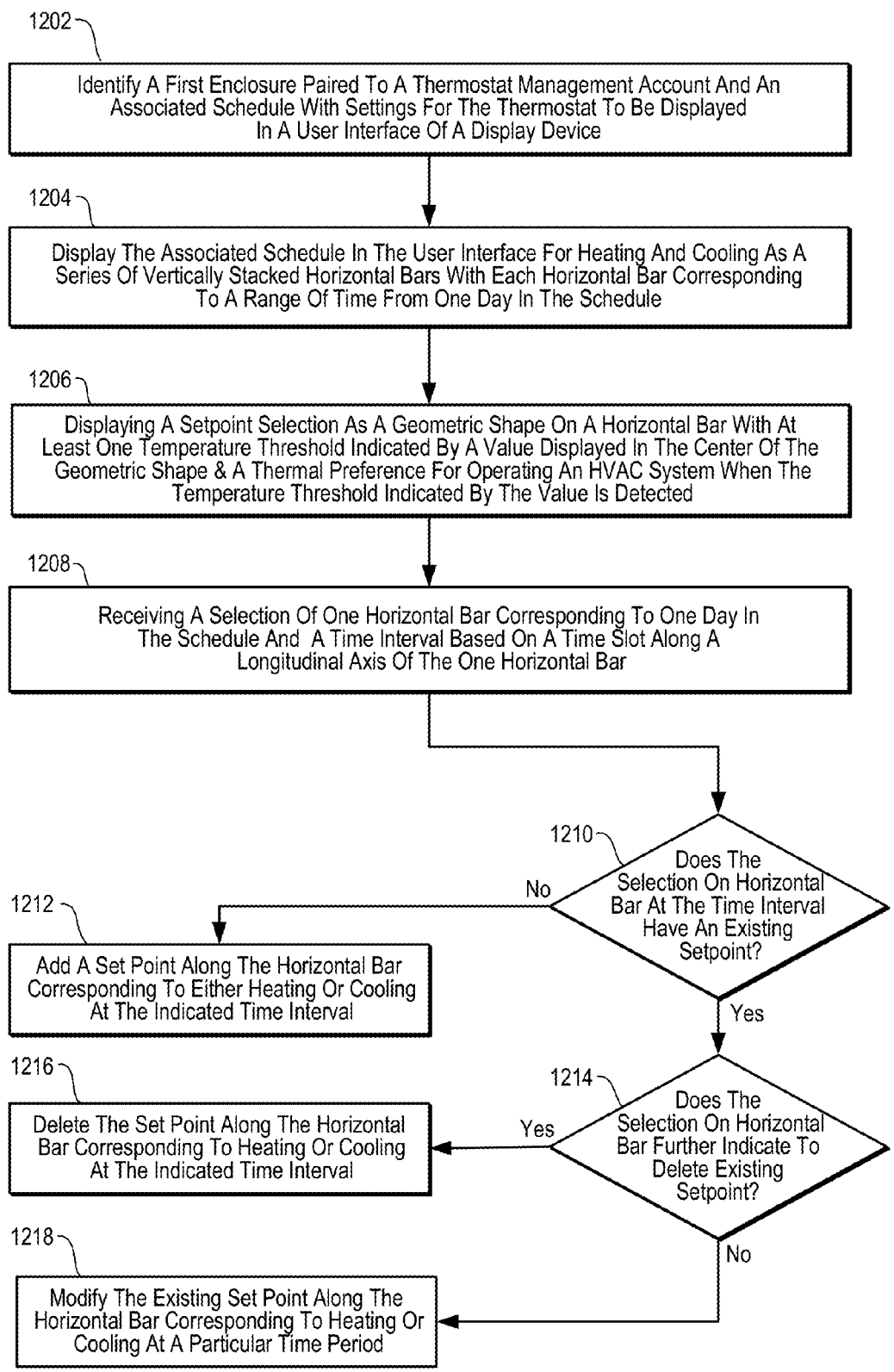

FIG. 12D is a flowchart diagram corresponding to a user interface method for interacting with a heating and cooling schedule in a thermostat according to embodiments of the present invention. In one embodiment, the user interface method may identify a first enclosure paired to a thermostat management account and an associated schedule with settings for the thermostat. (1202). The first enclosure may default to the enclosure labeled "HOME" or the first enclosure in the list of enclosures configured in the thermostat management account.

Based on the identified enclosure, one embodiment may then display a heating and cooling schedule for the thermostat on the user interface of the computer device as one or more vertically stacked horizontal bars corresponding to one or more days in the heating and cooling schedule for the thermostat. (1204) Each horizontal bar includes a range of time in one day measured along a horizontal direction of each horizontal bar in the schedule. For example, a horizontal bar at the left most range may start a day at 12:00 midnight or 00:00 on a 24 hour schedule and run to the right until the schedule ends at 11:59 pm or 23:59.

The interface also displays a setpoint selection as a geometric shape located on one of the one or more vertically stacked horizontal bars (1206). In embodiment, the setpoint selection has at least one temperature threshold indicated by a value displayed in the center of the geometric shape. Preferably, the geometric shape is a round circle or concentric circles however other shapes may also be used. For example, a single value such as 70 may indicate a 70 degree threshold while two values such as 62/76 indicates a range associated with the setpoint selection. Depending on the color or colors, one embodiment of the setpoint selection indicates a thermal preference for operating an HVAC system. For example, a "red" colored geometric shape may indicate to heat until the temperature threshold associated with the setpoint selection is reached. Two colors such as "red" and "black" coupled with two threshold levels, such as 62/76 may indicate to heat until a lower threshold of 62 is met and then cool if an upper threshold amount 76 is exceeded.

In a further aspect of the user interface, the schedule for heating and cooling may receive a selection on one of the several horizontal bar to interact with one or more setpoint selections at a particular time interval. (1208) For example, the selection may be from a mouse or other pointing device indicating a selection on the screen of a computer running a thermostat access client and user interface in accordance with the present invention. One embodiment determines if the time interval selected on the horizontal bar already has a setpoint selection. (1210) If no setpoint selection exists at the time interval (1210-No), the selection by the pointing device may indicate to add a setpoint at the time interval of the one horizontal bar. (1212) The setpoint selection added may indicate either heating, cooling or both and may also specify one or two thresholds for operating the setpoint. A thermal preference for cooling may be indicated by making the geometric shape "blue" while a thermal preference for heating may be indicated with a geometric shape that is "red".

Alternatively, if a setpoint exists at the time interval (1210—Yes), the selection by the pointing device may further indicate to delete the setpoint through an additional indication. (1214—Yes) For example, a right click or double-click of a mouse within the thermostat access client in the user interface could indicate that a particular existing setpoint at a time interval on one horizontal bar should be deleted. (1216) However, if the pointing device does not indicate to delete the setpoint (1214—No), the selection by the pointing device may instead be used to modify the setpoint along the horizontal bar. For example, the user interface may be used to modify the temperature threshold, time interval, or thermal preference for the set point at the particular time interval and day in the schedule. (1218)

Figure 13:
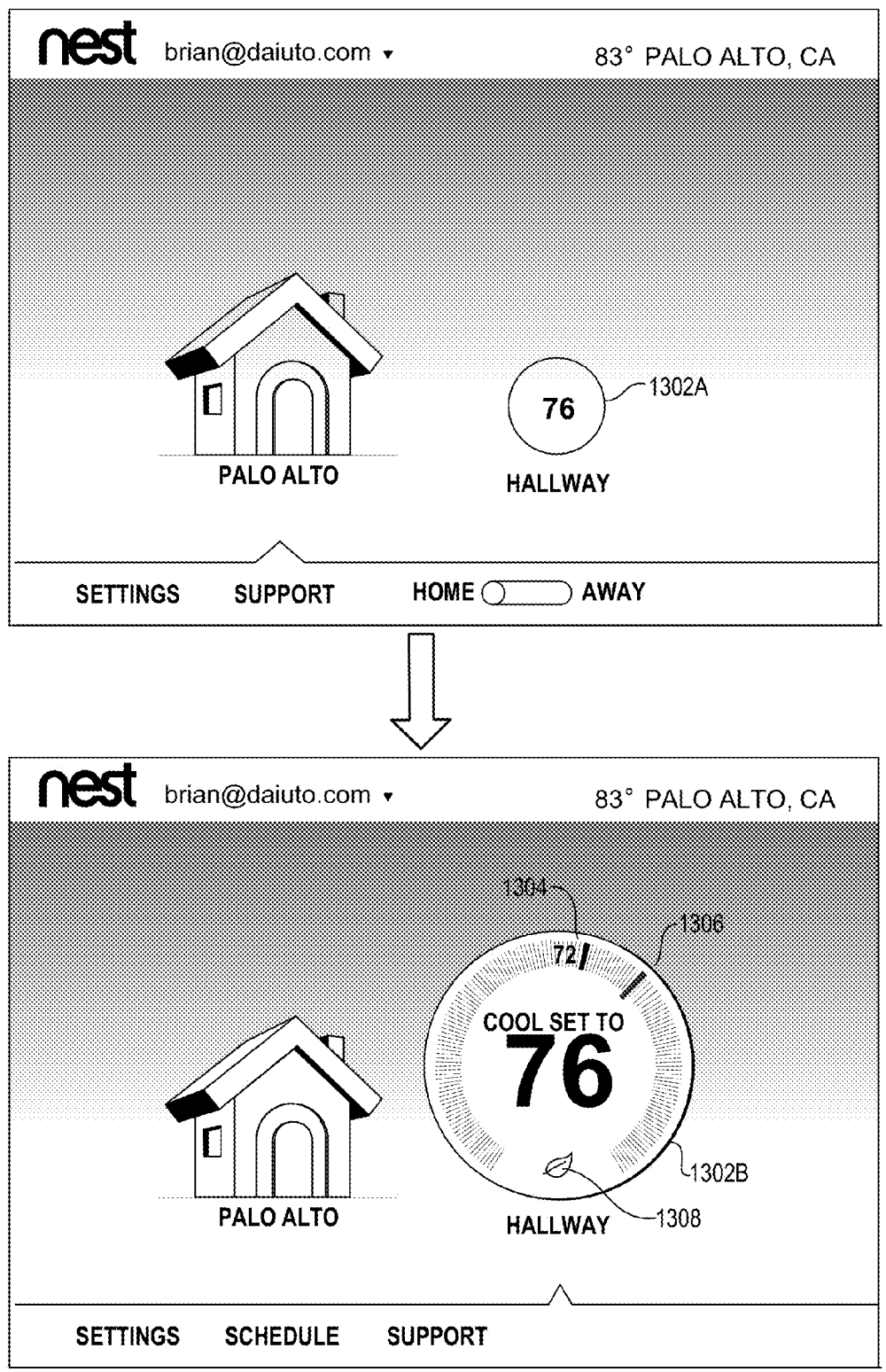
FIG. 13 illustrates a user interface screen of a thermostat access client in accordance with embodiments of the present invention

FIG. 13 illustrates a user interface for a thermostat access client for a relatively basic scenario in which there is a single enclosure and a single thermostat, for the purpose of describing current setpoint manipulation using the thermostat access client according to a preferred embodiment. For the enclosure-based view of the upper screen of FIG. 13, the thermostat is represented by the relatively small or modestly sized thermostat icon 1302A. However, when the user clicks on or near the thermostat icon 1302A, the screen changes to a thermostat-based view shown in the lower screen of FIG. 13, in which the thermostat is represented by a relatively large thermostat image 1302B. Displayed on the thermostat image 1302B is the current ambient temperate 1304 in both a tickmark form and a digital form, the current setpoint temperature (76 degrees F.) in large centrally located numerals, and a tick mark 1306 that is also representative of the current setpoint temperature. Also shown is an emotionally reward leaf icon 1308 which, as described in one or more of the commonly assigned incorporated references, gives feedback that user behavior is consistent with good energy saving behavior. For one embodiment, the user can change the current setpoint temperature of the thermostat by clicking and dragging the current setpoint tick mark 1308 along the dial to a desired temperature location, wherein the large numerical setpoint temperature in the middle of the dial will also change according to the dragged tick mark position. For some embodiments, the change in thermostat setpoint temperature imposed remotely is treated equivalently by the thermostat as if the user walked up personally to the dial of the thermostat in the home, such as for purposes of detecting patterns in user temperature adjustment behavior or for other automated learning purposes.

Figure 14A:
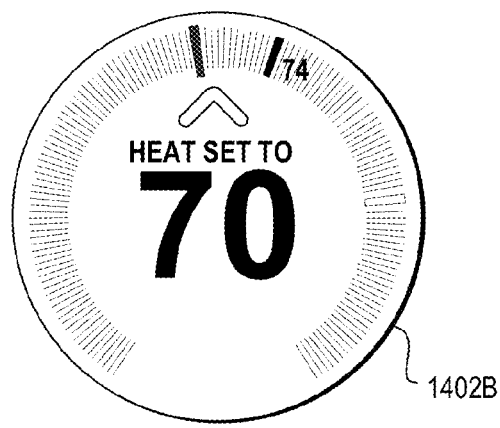
FIGS. 14A-14C illustrate changing a current setpoint temperature using a thermostat access client in accordance with embodiments of the present invention.
Figure 14B:
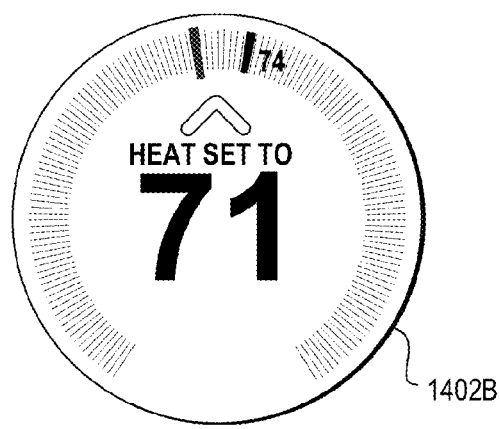
Figure 14C:
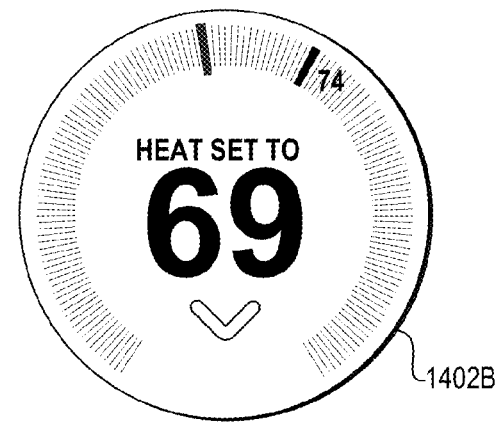

FIGS. 14A-14C illustrate the thermostat image 1302B from FIG. 13 for examples in which the current setpoint temperature of the thermostat is changed according to another preferred embodiment. More particularly, when the user places their mouse pointer or otherwise touches a region on the thermostat image 1302B that is directly above the large numerical central setpoint temperature, an upward facing caret icon is displayed as shown (FIG. 14A). The user can then click on or near the upward facing caret icon to increase the current setpoint temperature (FIG. 14B). On the other hand, if the user places their mouse or otherwise touches a region below the large numerical central setpoint temperature, a downward facing icon will appear, and the user can click thereon or therenear to lower current setpoint temperature (FIG. 14C).

Figure 15A:
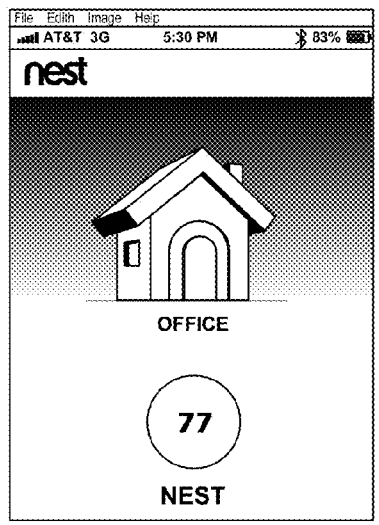
FIGS. 15A-15C illustrate user interface screens associated with a thermostat access client carried out on a smartphone or other handheld device.
Figure 15B:
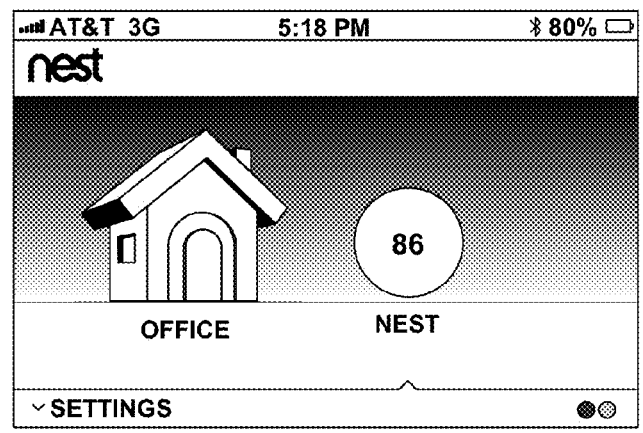
Figure 15C:
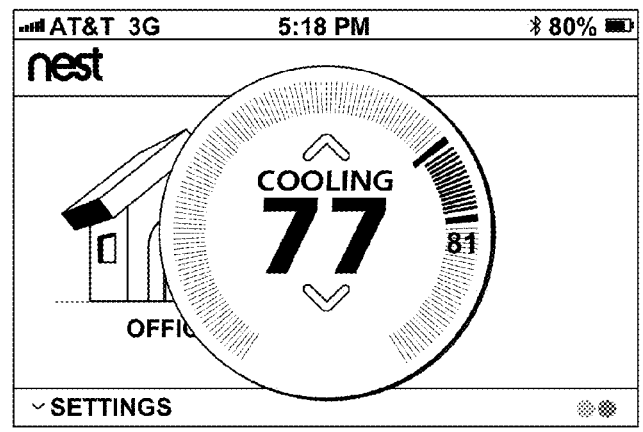

FIGS. 15A-15C illustrate user interface screens associated with a thermostat access client carried out on a smartphone or other handheld device having a relatively small screen. As illustrated, these user interfaces displays are provided with themes and functionalities similar to those provided for larger screens, but are judiciously adapted to fit into a smaller overall space. Thus, for example, if the user clicks on the thermostat icon shown in FIG. 15B, an enlarged thermostat image will appear as in FIG. 15C to occupy substantially the entire foreground of the screen, and the house landscape is dimmed out and placed in the background. This can be contrasted with larger-screen implementations as shown in FIG. 13, supra, wherein the general house landscape can stay in place while still accommodating the enlarged thermostat image.

Accordingly, various modifications may be made without departing from the spirit and scope of the invention. Indeed, various user interfaces for operating thermostats, HVACSs and other devices have been provided yet the designs are meant to be illustrative and not limiting as to the scope of the overall invention. While methods and systems have been described for pairing thermostats using autopairing and passcode pairing, it is contemplated that these methods and system may be applied to any device on a private network attempting to pair with an account. For example, embodiments of the present invention are not limited to network attached thermostats but any device connected to a network such as set-top boxes, streaming server devices, streaming service applications, computers, mobile phones, voice-over-IP phones, or anything that might benefit from an autopairing function in accordance with embodiments of the present invention. In the case of user interfaces, numerous flowcharts have been provided representing the operation of these user interfaces yet it is contemplated that the steps presented in association with these interfaces may be interchanged, reordered and mixed and remain within the scope of aspects of the present invention. It is to be further appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described embodiments, but instead is defined by the appended claims in light of their full scope of equivalents.

What is claimed is:

1. A thermostat management system that manages a plurality of thermostats on a network using one or more computers, comprising:
    a registration server configured to execute on the one or more computers that receives thermostat metadata associated with a thermostat over a public network portion of the network and provisions an entry in a thermostat registration pool referenced by thermostat metadata that includes a thermostat identifier and a public network address associated with the thermostat awaiting to be paired with a thermostat management account;
    an update server configured to execute on the one or more computers that attempts to update software and firmware and configurations of each of the thermostats registered with the registration server if newer versions of software exists than currently used on each of the thermostats corresponding to each entry in the registration pool;
    a pairing server configured to execute on the one or more computers that facilitates associating a thermostat with a thermostat management account and authorizes communication with the thermostat using the thermostat management account;
    a thermostat front end user-interface server configured to execute on the one or more computers that facilitates generation of a user-interface for accessing one or more thermostats from a computer device accessing the thermostat management account on the system; and
    a thermostat backend server configured to execute on the one or more computers that manages access to data related to thermostats registered with the thermostat management system and organizes information received over the network related to heating and cooling of enclosures as controlled by the registered thermostats.

2. The system of claim 1, wherein the thermostat metadata includes a thermostat identifier that identifies the thermostat and a public network address used by the thermostat to communicate over the public network portion of the network to the thermostat management system.

3. The system of claim 1 wherein the update server accesses each entry in the thermostat registration pool and then uses the metadata in each entry, including a public network address and a private network address, to connect to the corresponding thermostat over the public network portion of the network and a private network portion of the network.

4. The system of claim 1 wherein the update server performs a query to the thermostat for a current version of installed software then proceeds to send software updates to the thermostat over the network if the thermostat authorizes the software updates.

5. The system of claim 1 wherein the pairing server may automatically pair an entry in the registration pool associated with the thermostat to a thermostat management account if both the thermostat and a computer device using the thermostat management account have the same public network address.

6. The system of claim 5, wherein the pairing server is further configured to receive a confirmation from the thermostat that a thermostat management account identifier was displayed by the thermostat and that an input was received by the thermostat approving pairing of the thermostat with the thermostat management account.

7. The system of claim 5, wherein the public network address is associated with a router, the router being part of a private network portion of the network and facilitating communications between the public network portion of the network and the private network portion of the network, wherein the thermostat and the computer device using the thermostat management account are also part of the private network portion of the network.

8. The system of claim 5, wherein the public network address used to automatically pair the entry in the registration pool associated with the thermostat to the thermostat management account comprises a public network address from which the computer device most recently accessed the thermostat management account.

9. The system of claim 1, wherein the paring server is further configured to attempt to automatically pair the thermostat with the thermostat management account, and if the attempt to automatically pair the thermostat with the thermostat management account is unsuccessful, attempt to manually pair the thermostat with the thermostat management account.

10. The system of claim 9, wherein the attempt to automatically pair the thermostat to the thermostat management account is unsuccessful when the thermostat management account is accessed through a public network address and at least one additional thermostat management account has been accessed from the same public network address within a predetermined time period.

11. The system of claim 1, wherein the pairing server may transmit a passcode over the public network portion of the network to the thermostat located on a private network portion of the network and then pair the entry in the thermostat registration pool associated with the thermostat to the thermostat management account that provides the passcode as it indicates that a user obtained the passcode from the thermostat and provided it to the thermostat management account.

12. The system of claim 11, wherein the passcode is associated with an expiration time, and if the thermostat management account provides the passcode after the expiration time, then the entry in the thermostat registration pool is not paired with the thermostat management account.

13. The system of claim 1, wherein the thermostat front end user-interface displays an image of a house representing a primary enclosure paired to the thermostat management account and further displays images of one or more thermostats for each thermostat inside the primary enclosure with a current temperature displayed on each of the one or more thermostats reflecting a temperature of the area in which each thermostat is installed.

14. The system of claim 13, wherein the thermostat front end user-interface further displays an image of an additional house representing a secondary enclosure paired to the thermostat management account with the image of the additional house deemphasized in relationship to the image of the house representing the primary enclosure.

15. The system of claim 14, wherein the thermostat front end user-interface further receives a selection of the secondary enclosure, and in response to receiving the selection of the secondary enclosure deemphasizes the image of the house representing the primary enclosure in relationship to the image of the additional house representing the secondary enclosure.

16. The system of claim 13, wherein the user interface generated by the thermostat front end user-interface server is configured to display a separate thermostat icon for each thermostat operating within the primary enclosure.

17. The system of claim 1, wherein the thermostat backend server further provides one or more predetermined heating and cooling schedules for uploading over the public network portion of the network to the registered thermostats.

18. The system of claim 1, wherein the user interface generated by the thermostat front end user-interface server is configured to receive one or more temperature setpoints for controlling the operation of the thermostat, the one or more temperature setpoints being received through one or more bar controls, each of the one or more bar controls corresponding to a single day of the week.

19. The system of claim 1, wherein the user interface generated by the thermostat front end user-interface server is configured to display one or more temperature setpoints together on the user interface, wherein the one or more temperature setpoints are spaced according to a timescale.

20. The system of claim 1, wherein the user interface generated by the thermostat front end user-interface server is configured to display a graphical representation of a user interface of the thermostat such that the graphical representation displays temperature controls and temperature information in a manner similar to a graphical user interface of the thermostat.

* * * * *